(12) United States Patent
Siddiqui et al.

(10) Patent No.: US 12,337,513 B2
(45) Date of Patent: Jun. 24, 2025

(54) INJECTION MOLDING SYSTEM FOR FORMING A PRESSURE VESSEL

(71) Applicant: WAL Fuel Systems USA Inc., Livonia, MI (US)

(72) Inventors: Sami Siddiqui, Livonia, MI (US); Xiankai Song, Livonia, MI (US); Longhan Chen, Livonia, MI (US)

(73) Assignee: WAL Fuel Systems USA Inc., Livonia, MI (US)

( * ) Notice: Subject to any disclaimer, the term of this patent is extended or adjusted under 35 U.S.C. 154(b) by 126 days.

(21) Appl. No.: 18/509,811

(22) Filed: Nov. 15, 2023

(65) Prior Publication Data

US 2025/0153407 A1 May 15, 2025

(51) Int. Cl.
*B29C 45/27* (2006.01)
*B29L 31/00* (2006.01)

(52) U.S. Cl.
CPC .. *B29C 45/2708* (2013.01); *B29C 2045/2709* (2013.01); *B29L 2031/7156* (2013.01)

(58) Field of Classification Search
CPC ................. B29C 45/2708; B29C 45/2709
See application file for complete search history.

(56) References Cited

U.S. PATENT DOCUMENTS

| | | | | |
|---|---|---|---|---|
| 3,284,556 A | * | 11/1966 | Hay | B29C 33/52 264/250 |
| 4,403,933 A | * | 9/1983 | Davis | B29C 45/14 264/269 |
| 2014/0014667 A1 | * | 1/2014 | Flammer | B29C 45/14786 156/172 |
| 2019/0152175 A1 | * | 5/2019 | Park | B29C 45/2708 |
| 2023/0121190 A1 | * | 4/2023 | Lee | B29C 45/43 700/200 |

* cited by examiner

*Primary Examiner* — Thu Khanh T. Nguyen
(74) *Attorney, Agent, or Firm* — Young Basile Hanlon & MacFarlane, P.C.

(57) ABSTRACT

An injection molding system for forming a pressure vessel includes an injector that propels a polymeric material and a mold body in fluid communication with the injector. The mold body defines a cavity for receiving the polymeric material. The cavity includes a mold portion for forming the pressure vessel. The mold portion extends longitudinally along an axis between a first mold end and a second mold end. The cavity includes a transport portion that transmits the polymeric material from the injector to the mold portion. The transport portion includes a sprue connected to the injector and extending between the injector and the first mold end of the mold portion, runners connected to the sprue and extending radially from the axis, and gates connected to each of the runners and to the first mold end of the of the mold portion spaced around the substantially annular configuration.

20 Claims, 17 Drawing Sheets

INJECTION MOLDING SYSTEM FOR FORMING A PRESSURE VESSEL

TECHNICAL FIELD

The present disclosure relates to the technical field of injection molding of automobile parts, specifically a pressure vessel.

BACKGROUND

Pressure vessels may be used in various applications. For example, pressure vessels may be used as part of a vehicle system. Specifically, a pressure vessel may be to hold fuel (e.g., gases or liquids) at elevated pressures (e.g., pressures that exceed atmospheric pressure). Current pressure vessels are formed of metallic materials. While the pressure vessels made of metallic materials are useful and may hold fuel at elevated pressures, the metallic materials often have a high density, which increases the weight of the pressure vessel and lowers the efficiency of the vehicle system.

SUMMARY

One aspect of the disclosure is an injection molding system for forming a pressure vessel. The injection molding system includes an injector configured to compress and propel a polymeric material therethrough in a liquid state and a mold body mounted to and in fluid communication with the injector. The mold body defines a cavity for receiving the polymeric material in the liquid state and forming the pressure vessel as the polymeric material cools to a solid state. The cavity includes a mold portion configured to form the pressure vessel. The mold portion has a substantially annular configuration that surrounds an axis and extends longitudinally along the axis between a first mold end and a second mold end. The cavity further includes a transport portion in fluid communication with the mold portion and the injector and configured to transmit the polymeric material from the injector to the mold portion. The transport portion includes a sprue connected to the injector and extending between the injector and the first mold end of the mold portion, runners connected to the sprue and extending radially from the axis, and gates connected to each of the runners and to the first mold end of the of the mold portion spaced around the substantially annular configuration.

In some implementations of the injection molding system, the sprue extends along the axis such that the sprue is aligned longitudinally with the mold portion.

In some implementations of the injection molding system, the runners are evenly spaced from one another about the axis.

In some implementations of the injection molding system, the runners extend orthogonal to the axis.

In some implementations of the injection molding system, each of the gates are connected individually to the runners.

In some implementations of the injection molding system, the cavity comprises at least nine of the runners and at least nine of the gates.

In some implementations of the injection molding system, the gates extend parallel to the axis.

In some implementations of the injection molding system, the injector comprises a screw configured to compress the polymeric material into the liquid state.

In some implementations of the injection molding system, the mold body comprises at least two sections configured to engage and collectively form the cavity in a closed position for molding the pressure vessel and with the sections configured to be spaced from one another in an open position to separate the cavity and for removing the pressure vessel from the cavity.

In some implementations of the injection molding system, the injection molding system further includes a clamp coupled to the mold body and configured to move the sections between the closed position and the open position.

Another aspect of the disclosure is a mold for an injection molding system. The mold includes a mold body defining a cavity for receiving a polymeric material in a liquid state and forming a pressure vessel as the polymeric material cools to a solid state. The cavity includes a mold portion configured to form the pressure vessel. The mold portion has a substantially annular configuration that surrounds an axis and extends longitudinally along the axis between a first mold end and a second mold end. The cavity includes a transport portion in fluid communication with the mold portion and configured to receive the polymeric material in the liquid state from an injector and transmit the polymeric material to the mold portion. The transport portion includes a sprue configured to be connected to the injector and extend between the injector and the first mold end of the mold portion, runners connected to the sprue and extending radially from the axis, and gates connected to each of the runners and to the first mold end of the of the mold portion spaced around the substantially annular configuration.

In some implementations of the mold, the sprue extends along the axis such that the sprue is aligned longitudinally with the mold portion.

In some implementations of the mold, the runners are evenly spaced from one another about the axis.

In some implementations of the mold, the runners extend orthogonal to the axis.

In some implementations of the mold, each of the gates are connected individually to the runners.

In some implementations of the mold, the cavity comprises at least nine of the runners and at least nine of the gates.

In some implementations of the mold, the gates extend parallel to the axis.

In some implementations of the mold, the mold body comprises an ejector portion configured to engage and move the pressure vessel out of the cavity.

In some implementations of the mold, the mold body comprises at least two sections configured to engage and collectively form the cavity in a closed position for molding the pressure vessel and with the sections configured to be spaced from one another in an open position to separate the cavity and for removing the pressure vessel from the cavity.

Another aspect of the disclosure is a mold for an injection molding system. The mold includes a mold body defining a cavity for receiving a polymeric material in a liquid state and forming a pressure vessel as the polymeric material cools to a solid state. The mold body comprises at least two sections configured to engage and collectively form the cavity in a closed position for molding the pressure vessel and with the sections configured to be spaced from one another in an open position to separate the cavity and for removing the pressure vessel from the cavity. The cavity comprises a mold portion configured to form the pressure vessel. The mold portion has a substantially annular configuration that surrounds an axis and extends longitudinally along the axis between a first mold end and a second mold end. The cavity further comprises a transport portion in fluid communication with the mold portion and configured to receive the polymeric material in the liquid state from an injector and transmit the polymeric material to the mold portion. The transport portion comprises a sprue configured to be connected to the injector and extend between the injector and the first mold end of the mold portion. The sprue extends along the axis such that the sprue is aligned longitudinally with the mold portion. The transport portion further comprises runners connected to the sprue and extending radially from the axis. The runners are evenly spaced from one another about the axis. The transport portion further comprises gates connected to each of the runners and to the first mold end of the of the mold portion spaced around the substantially annular configuration.

BRIEF DESCRIPTION OF THE DRAWINGS

The disclosure is best understood from the following detailed description when read in conjunction with the accompanying drawings. It is emphasized that, according to common practice, the various features of the drawings may be not to-scale. On the contrary, the dimensions of the various features may be arbitrarily expanded or reduced for clarity.

DETAILED DESCRIPTION

The technical solutions in the examples of the present disclosure will be clearly and completely described below with reference to the accompanying drawings in the examples of the present disclosure. Obviously, the described examples are only a part of the examples of the present disclosure, but not all of the examples. Based on the examples of the present disclosure, all other examples obtained by those of ordinary skill in the art without creative effort shall fall within the protection scope of the present disclosure.

Figure 1:
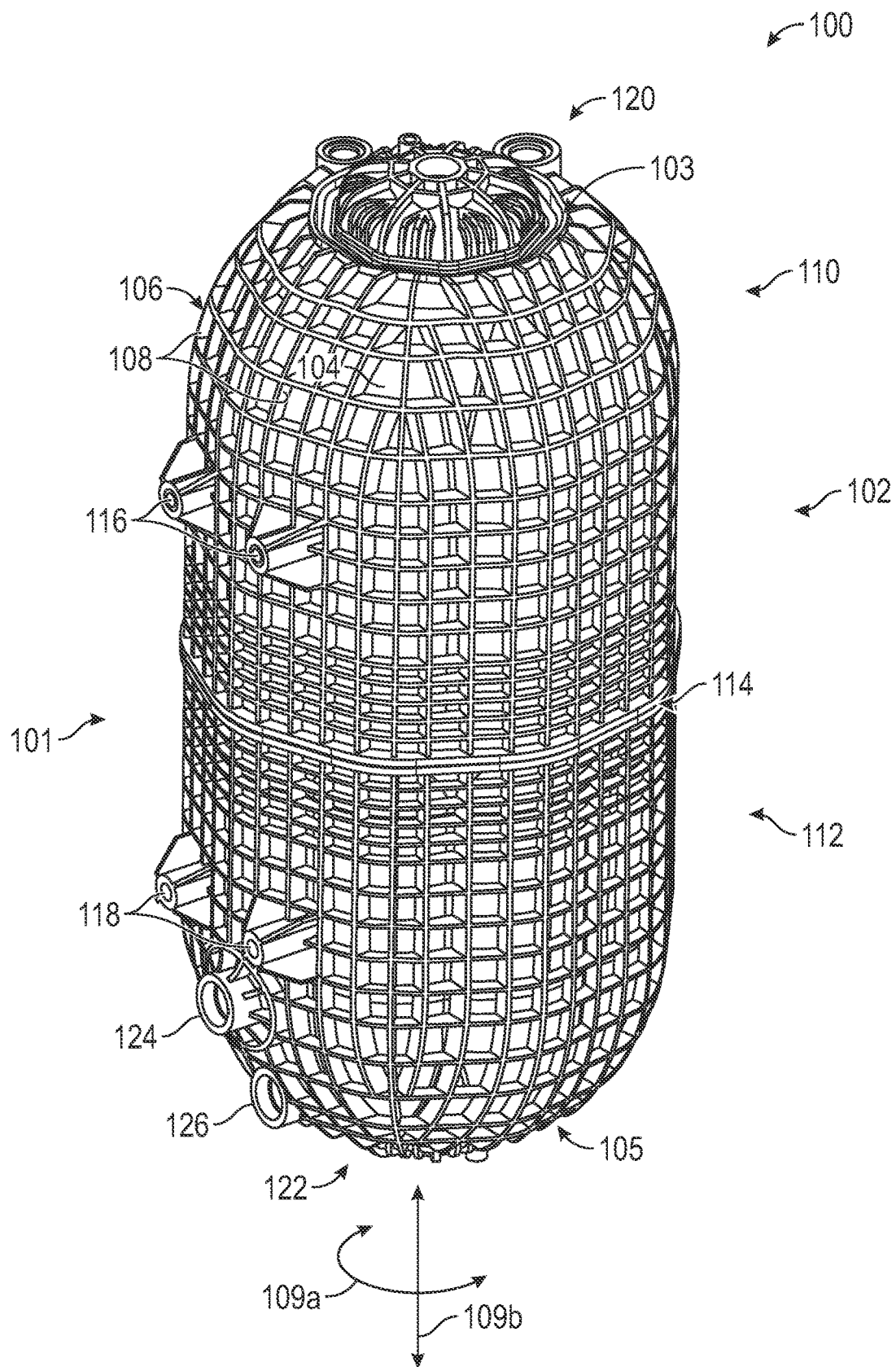
FIG. 1 is a perspective view of one example of a pressure vessel in an assembled configuration.

Referring to FIG. 1, in selected examples, a pressure vessel 100 may be configured to store one or more fluids. The pressure vessel 100 may be used in various applications. For example, the pressure vessel 100 may be used as part of a vehicle system. Specifically, the pressure vessel 100 may be to hold fuel (e.g., gases or liquids) at elevated pressures (e.g., pressures that exceed atmospheric pressure). The pressure vessel 100 may help store fuel that may be used by an engine and may dispense the fuel at a flow rate needed by the engine, which then may burn the fuel to generate energy to propel the vehicle.

In certain examples, the pressure vessel 100 may be formed of polymeric material having various reinforcements as desired or necessary. Polymeric material may offer several benefits due to its being lightweight and easily formable. The lightweight property of polymeric material may contribute to reducing the weight of a vehicle that incorporates or used the pressure vessel 100. This reduction in weight may enhance the overall fuel efficiency of the vehicle by reducing operational costs, pollutant emissions, etc. At the same time, with the application of various reinforcements, a pressure vessel 100 formed of polymeric material may also be capable of resolving stresses associated with elevated pressure within the pressure vessel 100 and preventing leaks, ensuring the safe and reliable use of the pressure vessel 100, and the like.

In selected examples, the pressure vessel 100 may comprise a wall 102 defining the shape and total volume of the pressure vessel 100. The shape may be cylindrical or tubular. The wall 102 may include of a barrier 104 and a support portion 106 providing structural support to the barrier 104.

In selected examples, the barrier 104 may be formed of a polymeric material. The support portion 106 may also be formed of a polymeric material. The polymeric material of the support portion 106 may be the same as or different from the polymeric material forming the barrier 104. The barrier 104 and the support portion 106 may be monolithic, which refers a single piece of material without joints or seams. As a result, it may provide increased resistance to leaks and elevated pressures.

In certain examples, the support portion 106 may be or comprise external ribs 108 arranged on an outer surface of the barrier 104. The external ribs 108 may be reinforcing ribs reinforcing and providing support to the barrier 104. A thickness of the external ribs 108 may range from about 1 mm to about 3 mm. In another example, the thickness of the external ribs 108 may range from about 2 mm to about 3 mm. In another example, the thickness of the external ribs 108 may range from about 2.2 mm to about 2.7 mm. The external ribs 108 may be arranged in any suitable pattern.

As the local stresses imposed on the different portions of the pressure vessel 100 may be different, the pattern may vary across those different portions in order to properly support the barrier 104. For example, the pattern, spacing between the external ribs 108, thickness and depth of the external ribs 108, or the like may be selected to provide a desired strength to the support portion 106. In selected examples, the external ribs 108 or a subset thereof may form a radial pattern (e.g., external ribs 108 that extend radially away from sub-component such as an aperture or port in the pressure vessel 100). Alternatively, or in addition thereto, the external ribs 108 may intersect so as to form a particular shape (e.g., a repeating shape) therebetween. For example, the external ribs 108 or a subset thereof may intersect to form a diamond pattern, a honeycomb pattern, a square pattern, a rectangular pattern, a triangular pattern, and the like or a combination or sub-combination thereof.

In certain examples, the pattern may be or comprise external ribs 108 that extend circumferentially (i.e., in a circumferential direction 109a) around the pressure vessel 100, external ribs 108 that extend axially (i.e., in an axial direction 109b) with respect to the pressure vessel 100, or the like or a combination or sub-combination thereof. Intersections between such ribs may be orthogonal, or at some other angle. For example, as the external ribs 108 that extend axially approach an end of the pressure vessel 100, they may converge or the like and cross the external ribs 108 that extend circumferentially at an angle that is less than or more than ninety degrees.

From a technological standpoint, it may be easier to form the external ribs 108 in certain locations on the pressure vessel 100 in different patterns than on other locations. Accordingly, the patterns for particular areas may be selected to provide a desired support strength, manufacturability, economy of material (e.g., efficient or optimal use of the material used to form the pressure vessel 100), or the like. In selected examples, the external ribs 108 forming in a radial pattern may be used around one or more apertures or ports in the pressure vessel 100, while the external ribs 108 forming a diamond pattern, a honeycomb pattern, a square pattern, rectangular pattern, or the like may be effective over large portions or the majority of the pressure vessel 100. In certain examples, to resolve or carry hope stress, certain portions of a pressure vessel 100 may include a higher density of external ribs 108 that extend circumferentially around the pressure vessel 100. That is, the external ribs 108 that extend circumferential may be closer together (e.g., have a reduced spacing in the axial direction 109b therebetween) so as to increase a load carrying capacity of selected regions or portion of the pressure vessel 100.

The pressure vessel 100 may further comprise one or more reinforcement rings surrounding the barrier 104 to provide additional structural rigidity to the pressure vessel 100. More specifically, the reinforcement rings may be disposed along the support portion 106 and be configured to reduce expansion of the pressure vessel 100 when filled with a fluid. The reinforcement rings may be comprised of a metal, polymer, ceramic, or any other suitable material. Moreover, the reinforcement rings may be coupled to the barrier 104 and/or the support portion 106 by an interference fit, bonding, welding, etc. Furthermore, the reinforcement rings may be integrally formed with the barrier 104 and/or the support portion 106 from a common material, such as a polymer.

In selected examples, the pressure vessel 100 may include a body 101. The body 101 may extend between a first end 103 and a second end 105. The body 101 may include an upper shell 110 (i.e., a first portion) and a lower shell 112 (i.e., a second portion). The upper shell 110 and the lower shell 112 may be substantially similar in structure to one another to promote ease of manufacturing and reduce production costs. The upper shell 110 may contain a first section of the barrier 104, and the lower shell 112 may contain a second section of the barrier 104. Similarly, the upper shell 110 may contain a first section of the support portion 106, and the lower shell 112 may contain a second section of the support portion 106. In other words, the upper shell 110 may contain a first segment of the wall 102, and the lower shell 112 may contain a second segment of the wall 102. One end of the upper shell 110 may be connected securely to one end of the lower shell 112 by welding (e.g., friction or ultrasonic welding) or the like. When welding, the selected areas or surfaces of the upper shell 110 and the lower shell 112 may abut to form a welded seam 114 when the material melt and fuse together during a welding process. The selected areas may include annular areas in the first segment of the wall 102 and the second segment of the wall 102.

In certain examples, the upper shell 110 may include one or more first mounts 116 and the lower shell 112 may include one or more second mounts 118. The first mounts 116 and the second mounts 118 may be used to secure the pressure vessel 100 to a surface or some other component or structure in a larger system. For example, the first mounts 116 and the second mounts 118 may be used to secure the pressure vessel 100 to one or more other parts of a vehicle system. The first mounts 116 and the second mounts 118 may provide a stable base to register the pressure vessel 100 with respect to a structural frame, chassis, or the like, thereby preventing any movement or disgorgement of the pressure vessel 100 during use and/or transport (e.g., while the vehicle is in motion).

In selected examples, the pressure vessel 100 may include a first end cap 120 and a second end cap 122 positioned opposite one another at opposite ends of the pressure vessel 100 in the axial direction 109b. More specifically, the first end cap 120 may be securely connected to the upper shell 110 (e.g., by welding or the like) at the first end 103. The second end cap 122 may be securely connected to the lower shell 112 (e.g., by welding or the like) at the second end 105. The first end cap 120 and the second end cap 122 may be similar (e.g., identical) in structure. In other examples, the upper shell 110 and the lower shell 112 shaped to close off at the first end 103 and the second end 105, respectively, making the first end cap 120 and the second end cap 122 unnecessary. As such, in certain examples the pressure vessel 100 may be formed without the first end cap 120 and the second end cap 122.

In certain examples, the lower shell 112 may include a first opening 124 and a second opening 126. The first opening 124 and the second opening 126 may be formed on a portion of the wall 102. The first opening 124 and the second opening 126 may provide locations for liquids and/or gases to pass into or out of the pressure vessel 100. In selected examples, the first opening 124 and the second opening 126 may be formed to support engagement therewith. For example, the first opening 124 and the second opening 126 may be formed with threads or the like that enable complementary structures such as valves, conduits, or the like to secure thereto in a sealed or leak-resistant manner.

Figure 2:
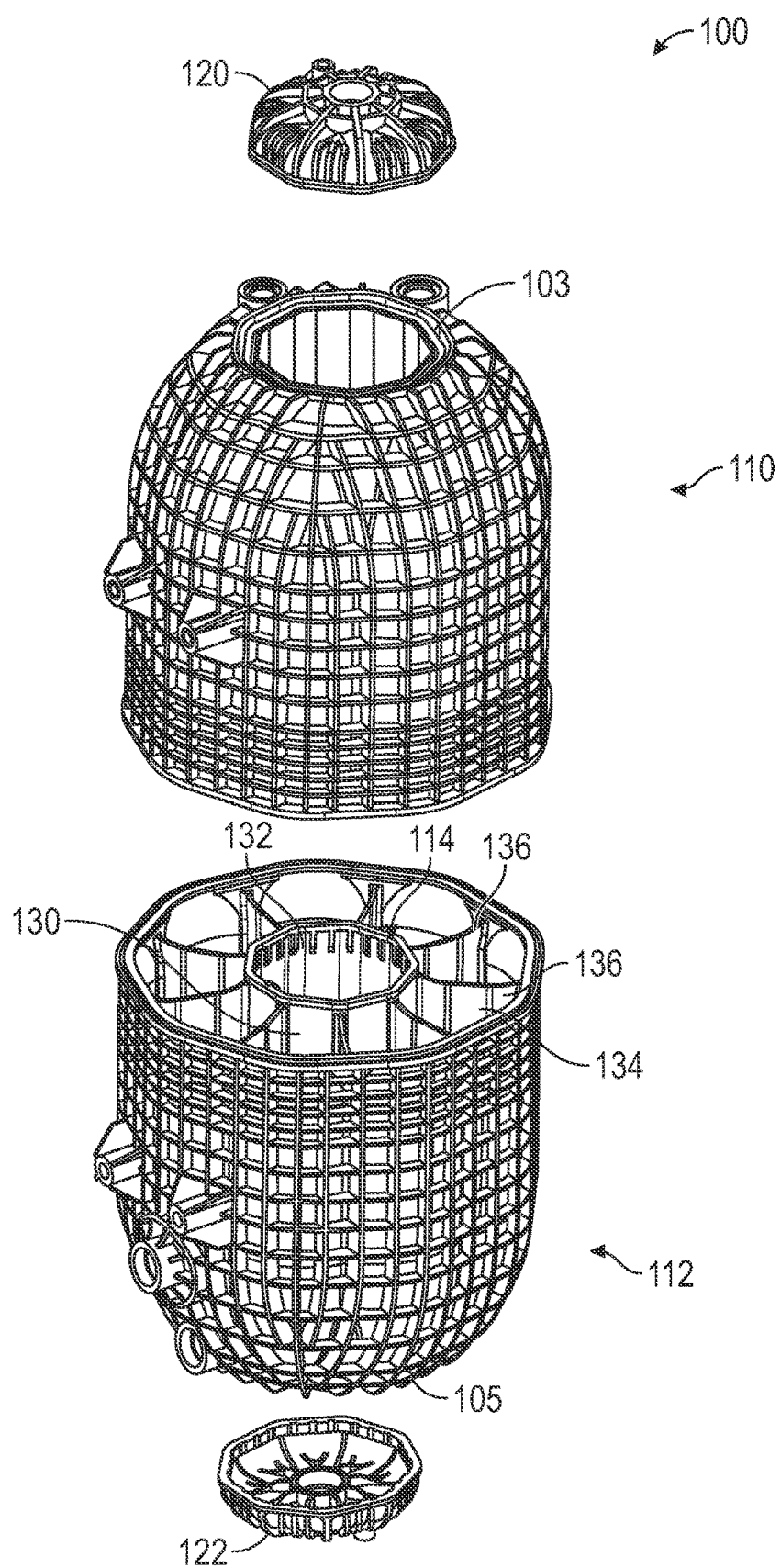
FIG. 2 is a perspective, exploded view of the pressure vessel of FIG. 1.
Figure 3:
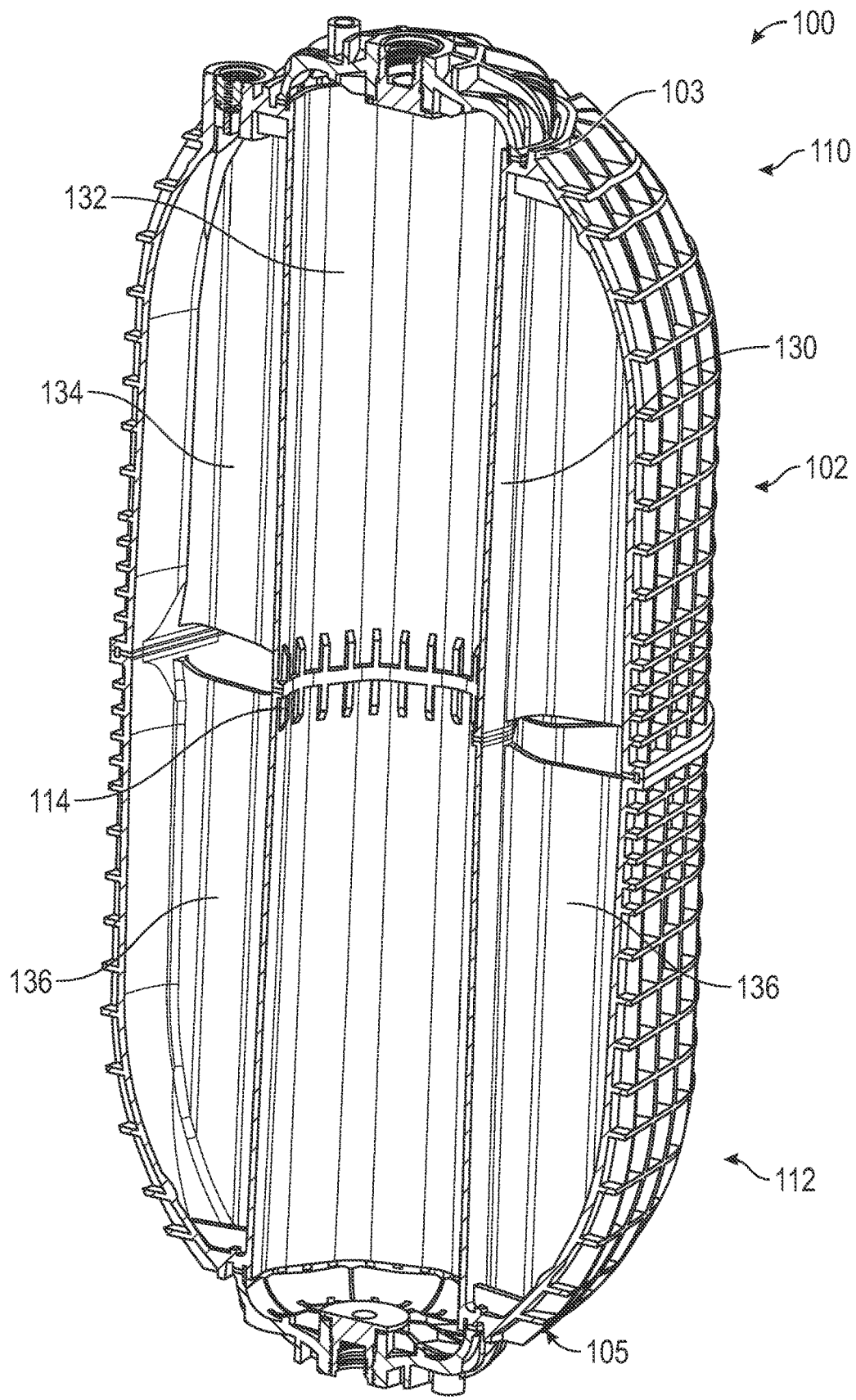
FIG. 3 is a perspective, cross-sectional view of the pressure vessel of FIG. 1.

Referring to FIGS. 2 and 3, in selected examples, the body 101 may define a first inner volume 132 and a second inner volume 134 that are in fluid-separation from each other, such that the first inner volume 132 and the second inner volume 134 may operate independently with no direct exchange of gases or fluids between them. The body 101 may include a center column 130 that encloses the first inner volume 132. As such, the center column 130 defines a first inner volume 132 extending between the first end 103 and the second end 105. The center column 130 also serves as the barrier to separate the first inner volume 132 from the second inner volume 134. The wall 102 surrounds the center column 130. The center column 130 and the wall 102 enclose the second inner volume 134 and define a second inner volume 134. The second inner volume 134 is disposed annularly around, and fluidly separate from, the first inner volume. The first inner volume 132 may be smaller in size than the second inner volume 134. The utilization of two different sized cavities may allow for efficient use of gas energy in vehicle operations. The larger inner volume may be well-suited to handle high-demand tasks like driving brakes, while the smaller inner volume may be optimal for low-demand tasks like parking brakes.

In certain examples, the body 101 may comprise internal ribs 136 arranged in the second inner volume 134. The internal ribs 136 may be tensile ribs, which experience tension loading when the pressure vessel 100 is charged or pressurized. The internal ribs 136 may extend axially from the first end 103 of the body 101 on the upper shell 110 approaching the welded seam 114. Similarly, the internal ribs 136 may extend axially from the second end 105 of the lower shell 112 approaching the welded seam 114. The internal ribs 136 in the upper shell 110 and the lower shell 112 may join together at the welded seam. Alternatively, the internal ribs 136 in the upper shell 110 and the lower shell 112 may not intersect and instead leave a gap where the internal ribs 136 extend. This gap provides a pathway for fluid or gas exchange between the upper shell 110 and the lower shell 112 and facilitates fluid exchange within the second inner volume 134.

In selected examples, one end of each of the internal ribs 136 (i.e., a distal end) may be connected to the wall 102, and the other end of each of the internal ribs 136 (i.e., a proximal end) may be connected to an outer wall of the center column 130. The internal rib may extend in a direction from a center of the center column 130 to a perimeter of the wall 102. The internal ribs 136, the wall 102, and the outer wall of the center column 130 may create a stable structure that makes the pressure vessel 100 into one cohesive piece. This design may allow the pressure vessel 100 to maintain its structural integrity even when the internal pressure greatly exceeds the external pressure. The interconnected nature of the internal ribs 136, the wall 102, and the center column 130 may make the pressure vessel 100 tolerate elevated pressures and retain shape. Additionally, the design may help distribute stress and pressure evenly throughout the pressure vessel 100, reducing the risk of weak points or vulnerable areas. A thickness of each internal rib may range from about 1 mm to about 5 mm. In another example, the thickness of each internal rib may range from about 2 mm to about 4 mm. In another example, the thickness of each internal rib may range from about 2.4 mm to about 3.9 mm.

In certain examples, the upper shell 110 may contain a first part of the center column 130, and the lower shell 112 may contain a second part of the center column 130. One end of the upper shell 110 may be connected securely to one end of the lower shell 112 by welding (e.g., friction or ultrasonic welding) or the like. When welding, the selected areas or surfaces of the upper shell 110 and the lower shell 112 may abut to form the welded seam 114 when the material melt and fuse together during a welding process. The selected areas may include annular areas in the first part of the center column 130 and the second part of the center column 130.

Figure 4A:
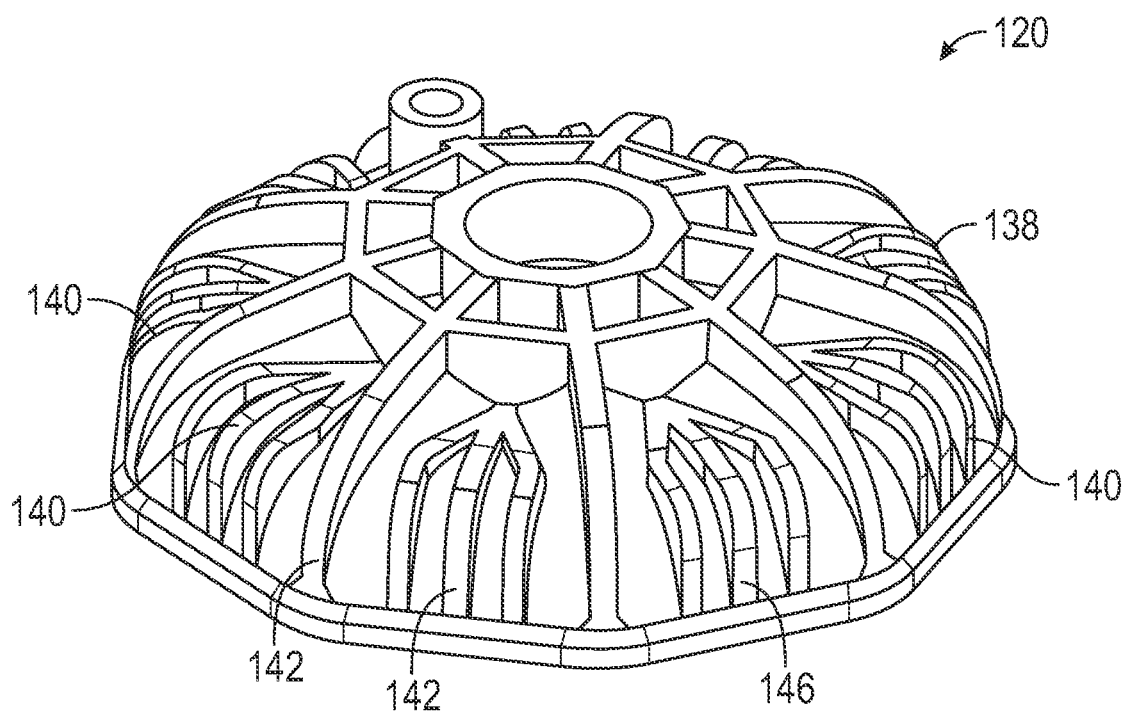
FIG. 4A is a perspective, top view of an end cap of the pressure vessel of FIG. 1.
Figure 4B:
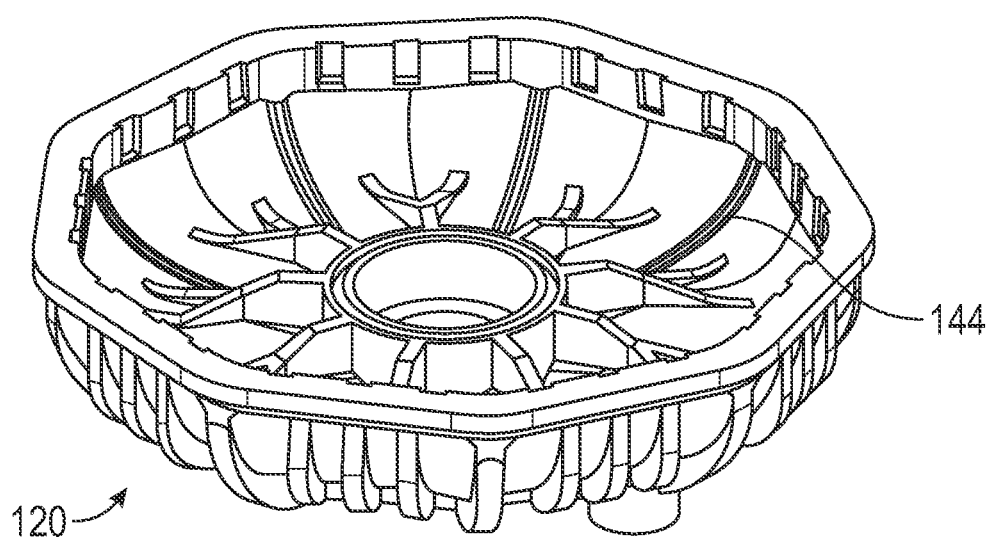
FIG. 4B is a perspective, bottom view of the end cap of FIG. 4A.

Referring to FIGS. 4A and 4B, in certain examples, the first end cap 120 may include a top surface 138. The top surface 138 may include multiple and identical iterations o the sub-sections 140 that cooperate to form the top surface 138. The first end cap 120 may include outer ribs 142 positioned on an exterior of the top surface 138 and separate or delineate each of the sub-sections 140. Each of the outer ribs 142 may extend radially from a central portion of the first end cap 120 to a perimeter of the first end cap 120. The outer ribs 142 may increase the strength or stiffness of the first end cap 120 in the axial direction. As a result, the first end cap 120 may have greater resistance to bending in the axial direction. For example, when an elevated pressure (e.g., 5 MPa pressure) is applied in the axial direction, the first end cap 120 may retain its shape and avoid bulging or bowing out in the axial direction.

In selected examples, the first end cap 120 may include inner ribs 144 positioned on an interior of the top surface 138. Each of the inner ribs 144 may extend radially from a central portion of the first end cap 120 toward a perimeter of the first end cap 120. Like the outer ribs 142, the inner ribs 144 may increase the strength or stiffness of the first end cap 120 in the axial direction. As a result, due to the combination of the outer ribs 142 and the inner ribs 144, the first end cap 120 may have greater resistance to bending, bulging, or bowing out in the axial direction.

In certain examples, the inner ribs 144 may be positioned directly interior to a sub-set 146 of the outer ribs 142. For example, a sub-set 146 of the outer ribs 142 may extend radial away from a central portion of the first end cap 120 and then divide or branch out as they extend toward the perimeter of the first end cap 120. Similarly, the inner ribs 144 may be positioned directly interior to the sub-set 146 of the outer ribs 142 and may also extend radial away from a central portion of the first end cap 120 and then divide or branch out as they extend toward the perimeter of the first end cap 120. Thus, the section modulus of certain portions of the first end cap 120 may be a combination of both the outer ribs 142 and the inner ribs 144.

In selected examples, each of the sub-sections 140 of the structure may create an arch in the middle of a portion of the top surface 138 corresponding thereto. The arch of each of the sub-sections 140 may produce something like corrugations extending radially outward from the central portion of the first end cap 120. The arch of each of the sub-sections 140 may enable the structure to deflect, or change shape, in response to external forces applied thereto. As a result, the first end cap 120 may be able to deform or move with the upper shell 110 as desired or necessary. For example, when the upper shell 110 expands circumferentially, the first end cap 120 may also expand or flex circumferentially. Conversely, when the upper shell 110 shrinks or contracts circumferentially, the first end cap 120 may also shrink or contract circumferentially.

When assembled, the upper shell 110 may be connected securely to the first end cap 120 by welding (e.g., friction or ultrasonic welding) or the like at the first end 103. For example, in the welding process, the corresponding areas or surfaces (e.g., annular surfaces) of the upper shell 110 and the first end cap 120 may abut and the material thereof may melt and fuse together. The ability of the first end cap 120 to circumferentially flex to harmoniously track the circumferential movement of the upper shell 110 may improve the toughness or durability corresponding to the seam (e.g., the welded seam) therebetween in the pressure vessel 100.

In the examples discussed above, various features or structures are presented in the context or as part of the upper shell 110. All such features or structures may be included as part of the lower shell 112. For example, in welding process, the corresponding areas or surfaces (e.g., annular surfaces) of the lower shell 112 and the second end cap 122 may abut.

In view of the foregoing, while the outer ribs 142 and the inner ribs 144 may resist flexing, bending, bulging, bowing, etc. of the first end cap 120 in the axial direction, the outer ribs 142 and the inner ribs 144 may provide little resistance to circumferential expansion or contraction. Moreover, the arch of each of the sub-sections 140 may enable or facilitate such circumferential expansion or contraction. Thus, the first end cap 120 may handle or resolve significant loads in the axial direction without excessive flexing, while still being sufficient flexible to accommodate circumferential expansion and contraction of the upper shell 110.

Figure 5:
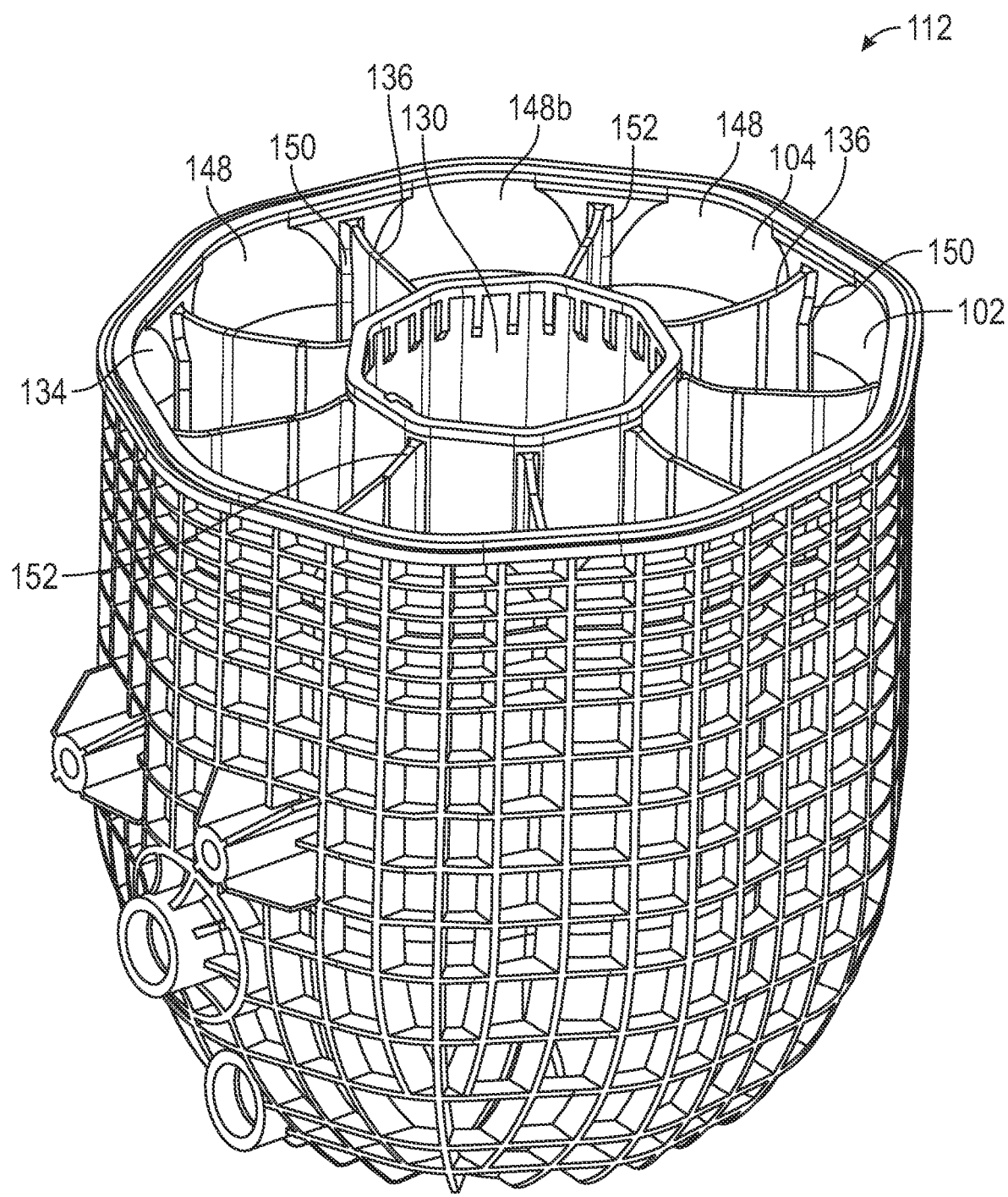
FIG. 5 is a perspective view of a lower shell of the pressure vessel of FIG. 1.
Figure 6:
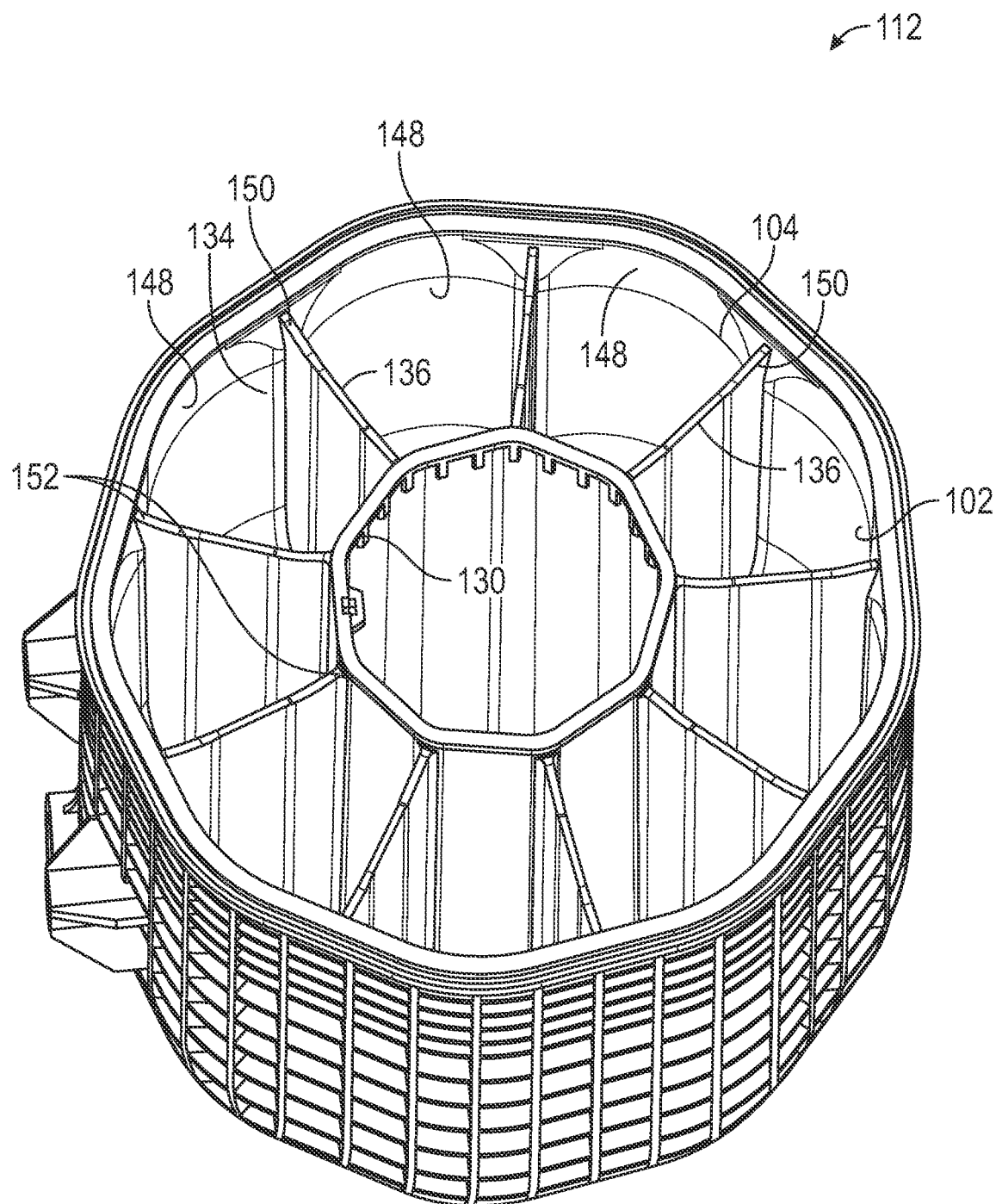
FIG. 6 is another perspective view of the lower shell of FIG. 5.
Figure 7:
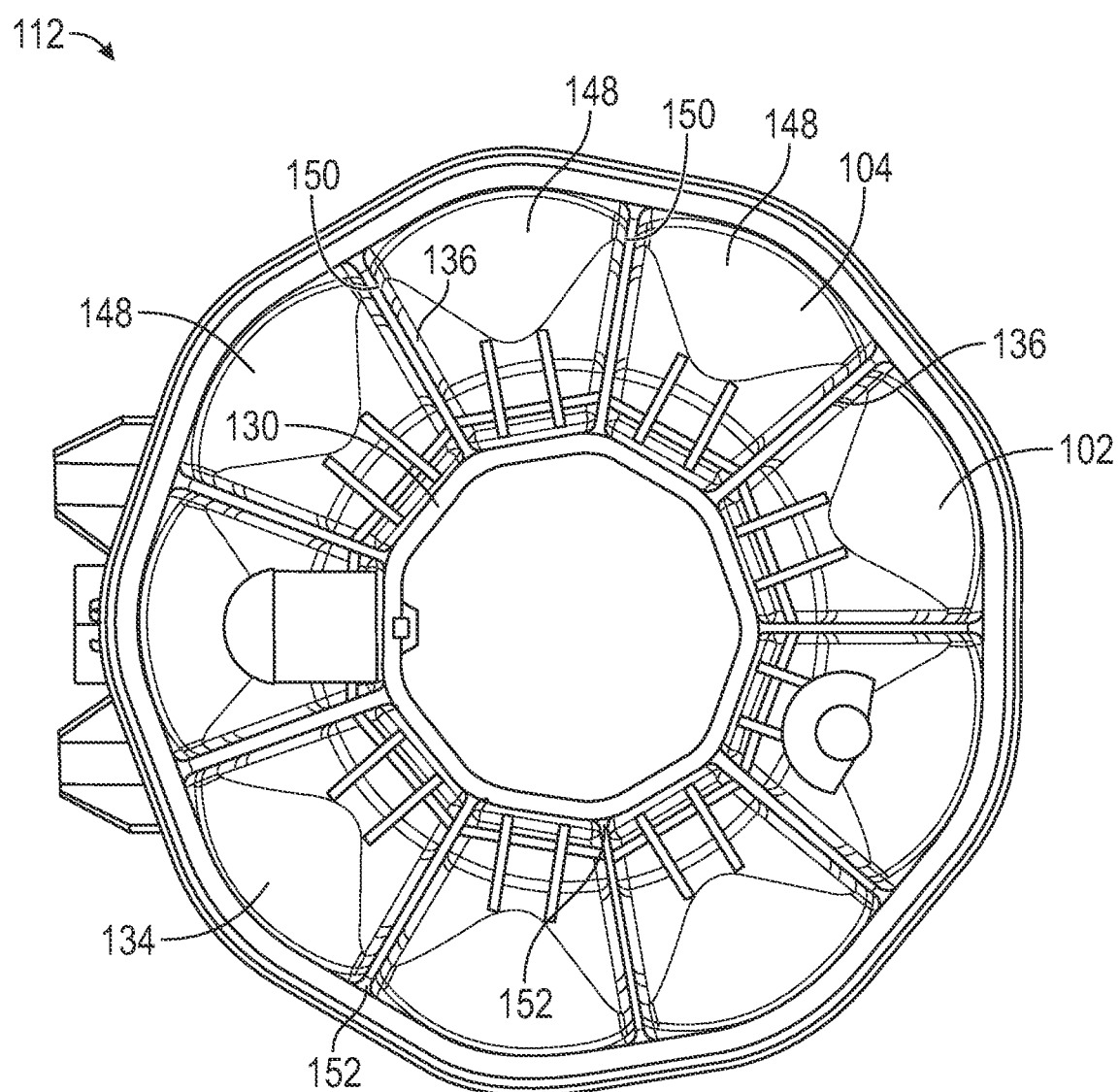
FIG. 7 is a top view of the lower shell of FIG. 5.

Referring to FIGS. 5-7, in certain examples, the wall 102 of the lower shell 112 may include arc segments 148. The arc segments 148 may form a part of the barrier 104. The arc segments 148 adjacent to one another may connect together to form petal-like structures or lobes that surround or encircle center column 130. That is, the petal-like structures or lobes may be formed by connecting multiple arc segments 148 in circumferential sequence, which may result in a petal-like appearance of the barrier 104 of the lower shell 112. This petal-like appearance may increase a surface area of the barrier 104 and enhance the strength of the lower shell 112. For example, in the event of elevated pressures inside the pressure vessel 100, certain stress concentrations in the lower shell 112 may be reduced by the curvature and more gradual or smoother transitions provided by the petal-like structures. Thus, due to the smooth curvature and radiuses of the arc segments 148, the wall 102 may withstand higher internal pressures.

In selected examples, the arc segments 148 may be connected in sequence to form the petal-like structures, with peaks 150 formed at the locations where arc segments 148 that are adjacent to one another join. The peaks 150 may protrude into the second inner volume 134 of the pressure vessel 100. To strengthen the pressure vessel 100 (e.g., increase the ability of the pressure vessel 100 to withstand elevated internal pressures), the internal ribs 136 may extend from the barrier 104 of the lower shell 112 near the peaks 150. For example, when two arc segments 148 are adjacent to each other, they may combine and form one of the peaks 150. To provide support to one of the peaks 150, one of the internal ribs 136 may extend therefrom toward the center column 130. One of the internal ribs 136 may be monolithically formed with one of the peaks 150 for added strength.

The body 101 may include fillets 152 formed at the transition of the internal ribs 136 and the barrier 104 and at the transition of the internal ribs 136 and the center column 130. The fillets 152 may relieve stress concentrations that may otherwise correspond to those areas. In this manner, each of the internal ribs 136 may be monolithically formed with the center column 130 and a respective one of the peaks 150 and increase the ability of the pressure vessel 100 to withstand elevated internal pressures. Alternatively, the body 101 may include radiuses or other like components formed at the transition of the internal ribs 136 and the barrier 104 and at the transition of the internal ribs 136 and the center column 130.

In certain examples, the internal ribs 136 may each extend as a single unit from a respective one of the peaks 150. Alternatively, the internal ribs 136 may branch or divide into two rib segments as the internal ribs 136 reach the peaks 150. Thus, rather than have a single line of engagement between each of the internal ribs 136 and the barrier 104, there may be multiple lines of engagement between each of the internal ribs 136 and the barrier 104. For example, each of the internal ribs 136 may branch into two rib segments to create two lines of engagement between each of the internal ribs 136 and the barrier 104. Thus, each of the peaks 150 may be bracketed between rib segments of a corresponding one of the internal ribs 136. This branching may allow for greater flexibility in relieving stress concentrations in the wall 102, thereby ensuring that the petal-like structure maintains its shape and structural integrity even under elevated pressures. This arrangement may provide additional structural support to the pressure vessel 100 and enhance the strength of the overall design, even when it is formed of polymeric material (e.g., thermoplastic material) in a molding process.

In selected examples, a cross section of the center column 130 orthogonal to axial direction 109b may have a circular shape. Alternatively, the cross section may have a polygonal shape. The number of sides of the polygonal shape may be the same as the number of the arc segments 148 forming the petal-like structures. For example, if five arc segments form the barrier 104 of the lower shell 112, then the cross section of the center column 130 may be shaped as a pentagon. In the illustrated example, the cross section has a nonagonal shape (i.e., forms a nine-sided polygon). In selected examples, the cross section may have a polygonal shape of between about 5 and about 10 sides. In general, having more sides (and consequently more internal ribs 136 and corresponding lobes of the petal-like structures) may correspond to or enable a pressure vessel 100 have a greater strength or ability to resist increased internal pressure.

In the examples discussed above, various features or structures are presented in the context or as part of the lower shell 112. All such features or structures may be included as part of the upper shell 110. For example, the upper shell 110 may include arc segments 148 that form petal-like structures, peaks 150, internal ribs 136, external ribs 108, and/or the like as described above.

Figure 8:
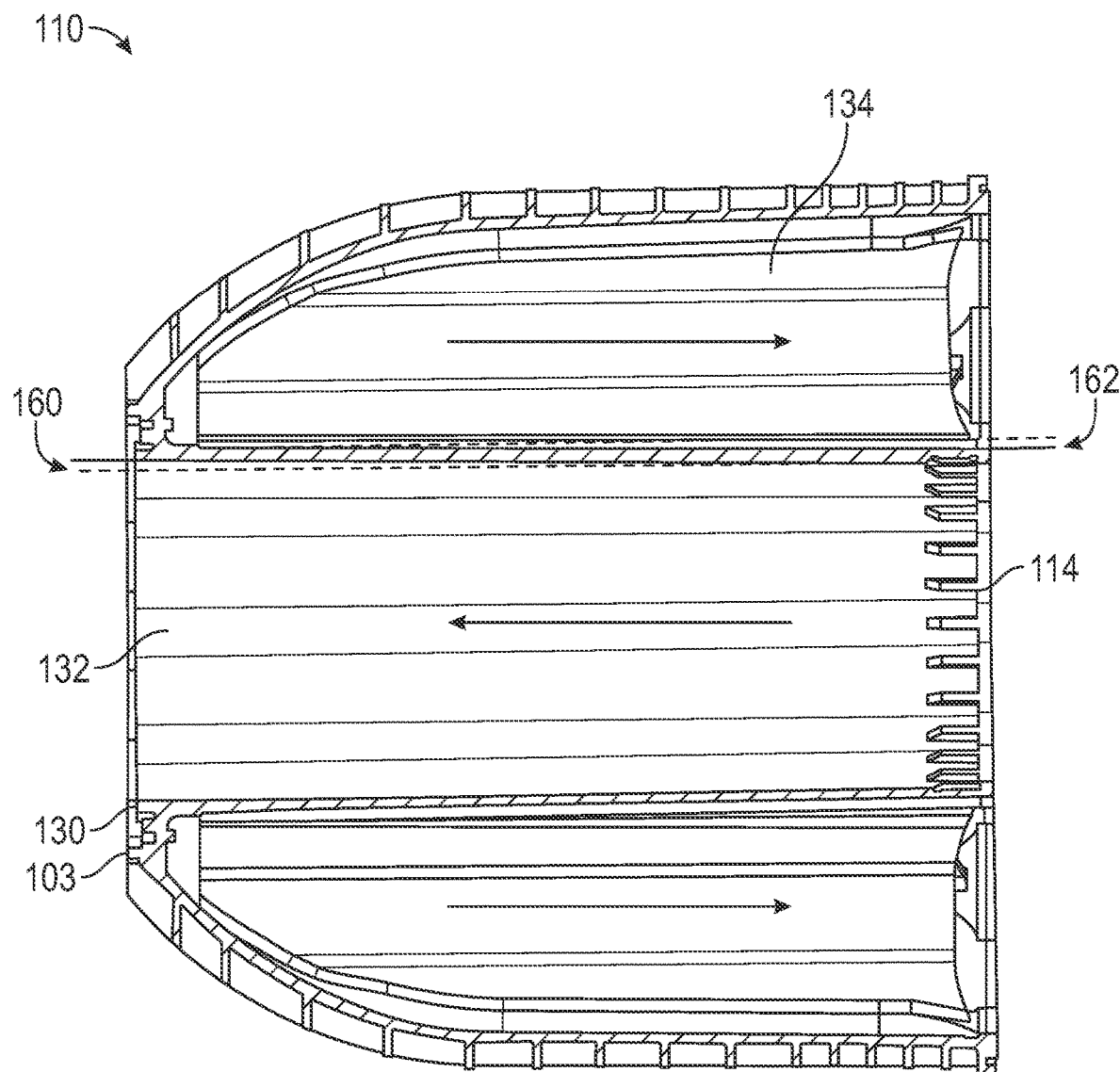
FIG. 8 is a cross-sectional view of an upper shell of the pressure vessel of FIG. 1.

Referring to FIG. 8, in certain examples, one or more instances of the upper shell 110 may be released or ejected from a mold during a molding process. In order to form various structures of an upper shell 110, different portions of the mold may pull away in different directions to release or eject the resulting part from a mold inner volume defined within the mold. That is, different components may combine to define the mold inner volume and one or more of those different components may be moved or pulled to release the resulting part from the mold inner volume. In selected examples, multiple cores may define certain interior cavities of the upper shell 110. Those multiple cores may be pulled or move with respect to one another in different directions (e.g., opposite directions) in order to release the upper shell 110 from the mold inner volume.

For example, the mold may include a first mold component or section and a second mold component or section. The first mold component may correspond to and define the first inner volume 132. The second mold component may correspond to and define the second inner volume 134. The center column 130 of the upper shell 110 may be moved or be released from the first mold component by moving in a first releasing direction aligned with the axial direction. Accordingly, the first mold component may have a first draft angle 160 selected to enable or facilitate such movement and/or release. In selected examples, the first release direction may correspond to the first mold component moving away from the welding surface of the upper shell 110 and out of the center column 130 through the end to which the first end cap 120 will eventually attach (i.e., the first end 103).

The second inner volume 134 and the internal ribs 136 therewithin may be defined by the second mold component. The barrier 104 of the upper shell 110 may be moved or be released from the second mold component by moving in a second releasing direction aligned with the axial direction. Accordingly, the second mold component may have a second draft angle 162 selected to enable or facilitate such movement and/or release. In selected examples, the second release direction may correspond to the second mold component moving away from the first end 103 and out the end corresponding to the welding surface of the upper shell 110. Thus, the direction of taper for the draft associated with the first mold component and the interior of the center column 130 may be opposite to the direction of taper for the draft associated with the second mold component, the exterior of the center column 130, and the interior of the barrier 104.

That is, the draft corresponding to the first draft angle 160 may produce or result in a sloping outward, away from a surface of the first mold section (i.e., a surface near the welded seam 114). As a result, the first mold component may be narrower near the welded seam 114 than the first end 103.

Conversely, the draft corresponding to the second draft angle 162 may produce or result in sloping outward, away from a surface of the second mold section (i.e., a surface near the first end 103). As a result, the second mold section may be wider near the welded seam 114 than the first end 103.

In the manner described above, adjacent or opposing surface of the first mold component and the second mold component may be substantially parallel in the area or inner volume that defines the center column 130. This configuration may allow for the center column 130 to have a uniform and relatively small thickness, while enabling the upper shell 110 to be released from the mold with minimal effort, binding, or damage. In certain examples, the lower shell 112 may be formed with similar cores, draft angles, etc. Accordingly, the lower shell 112 may have the same advantages as the upper shell 110 and be released or ejected from mold during a molding process in a similar manner described above. The first draft angle 160 or the second draft angle 162 may be between about 0.10 and about 1°. In another example, the first draft angle 160 or the second draft angle 162 may be between about 0.3° and about 0.8°. In another example, the first draft angle 160 or the second draft angle 162 may be about 0.6°.

Figure 9:
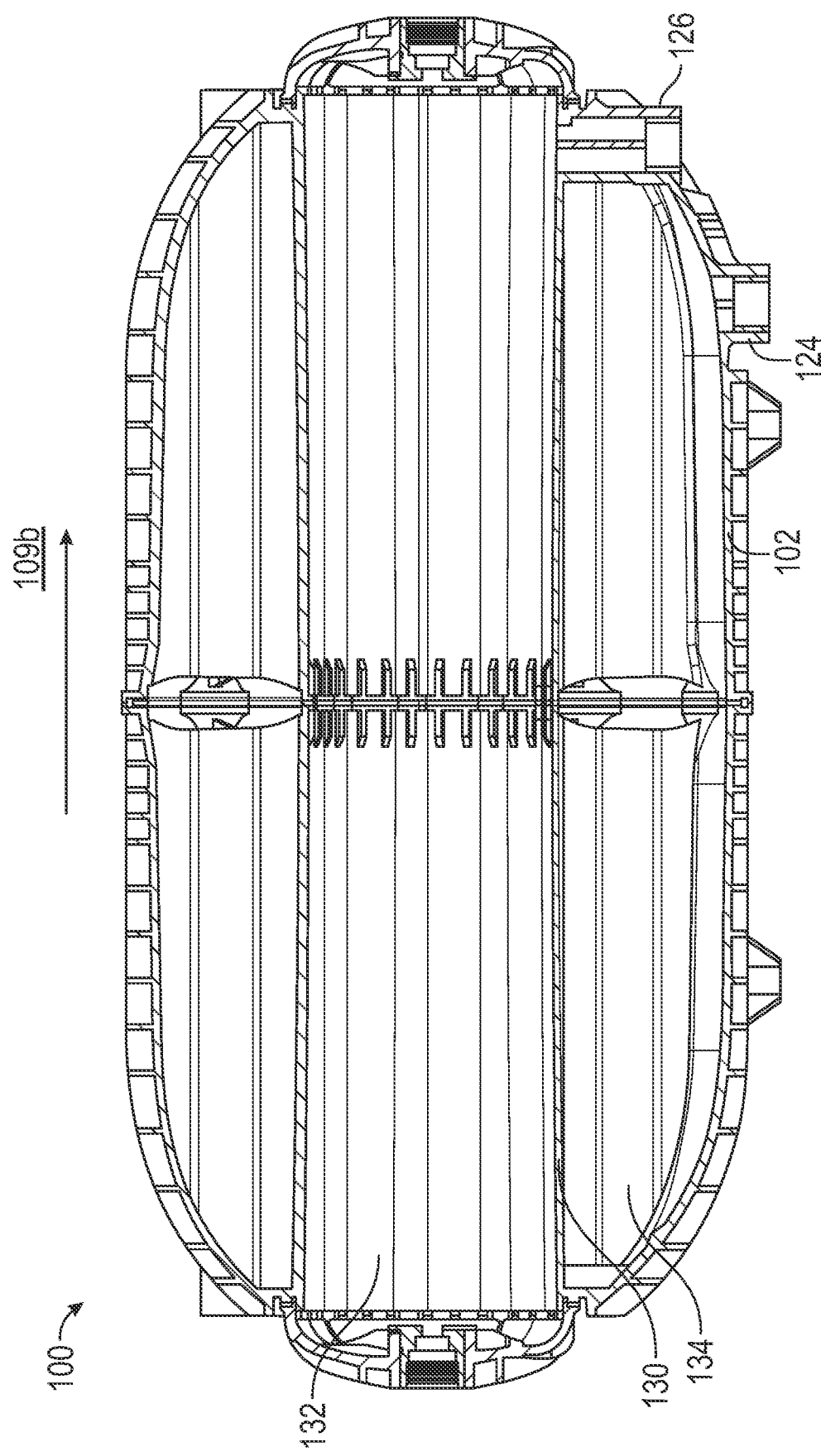
FIG. 9 is another perspective, cross-sectional view of the pressure vessel of FIG. 1.
Figure 10:
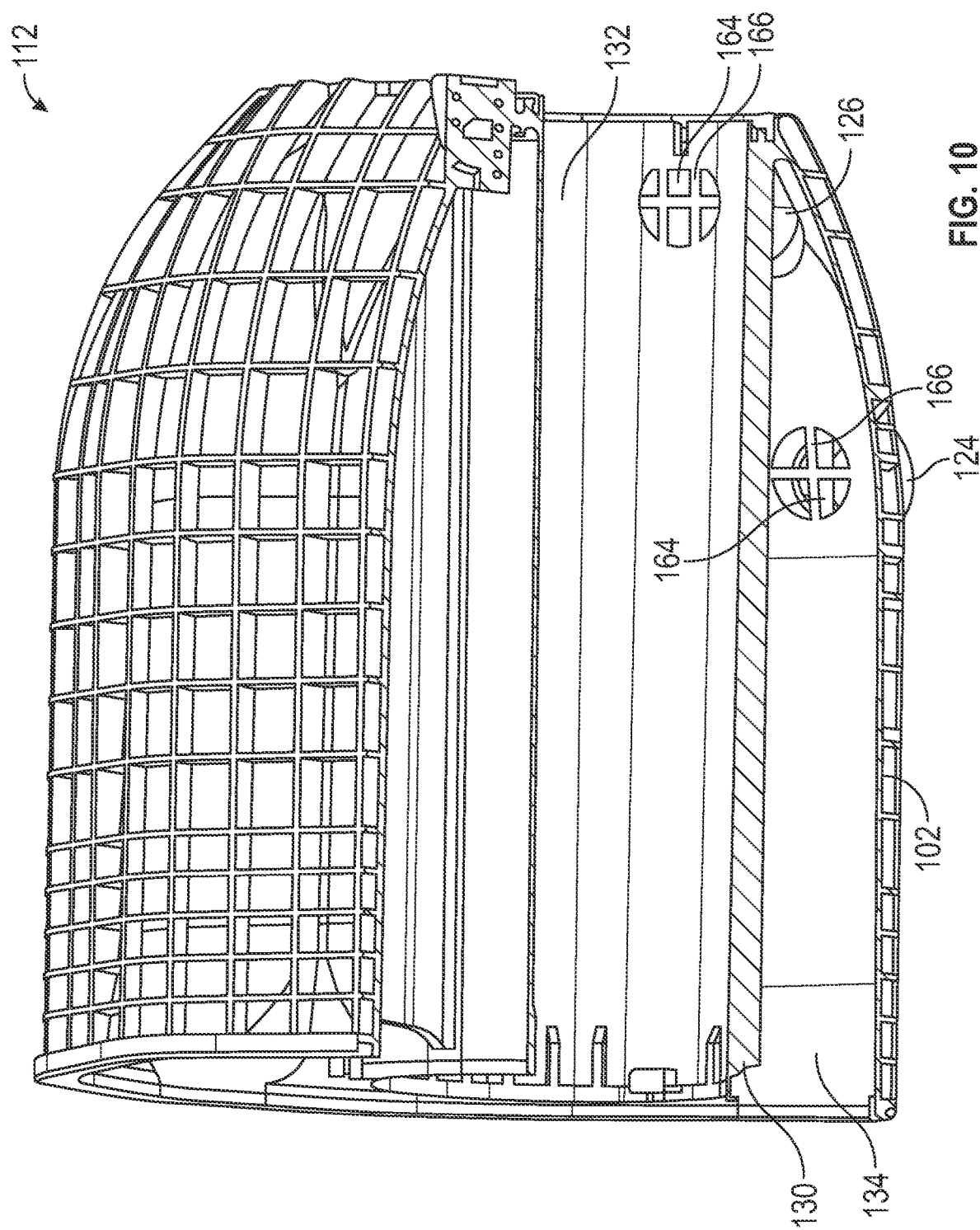
FIG. 10 is another perspective, cross-sectional view of the lower shell of FIG. 5.
Figure 11:
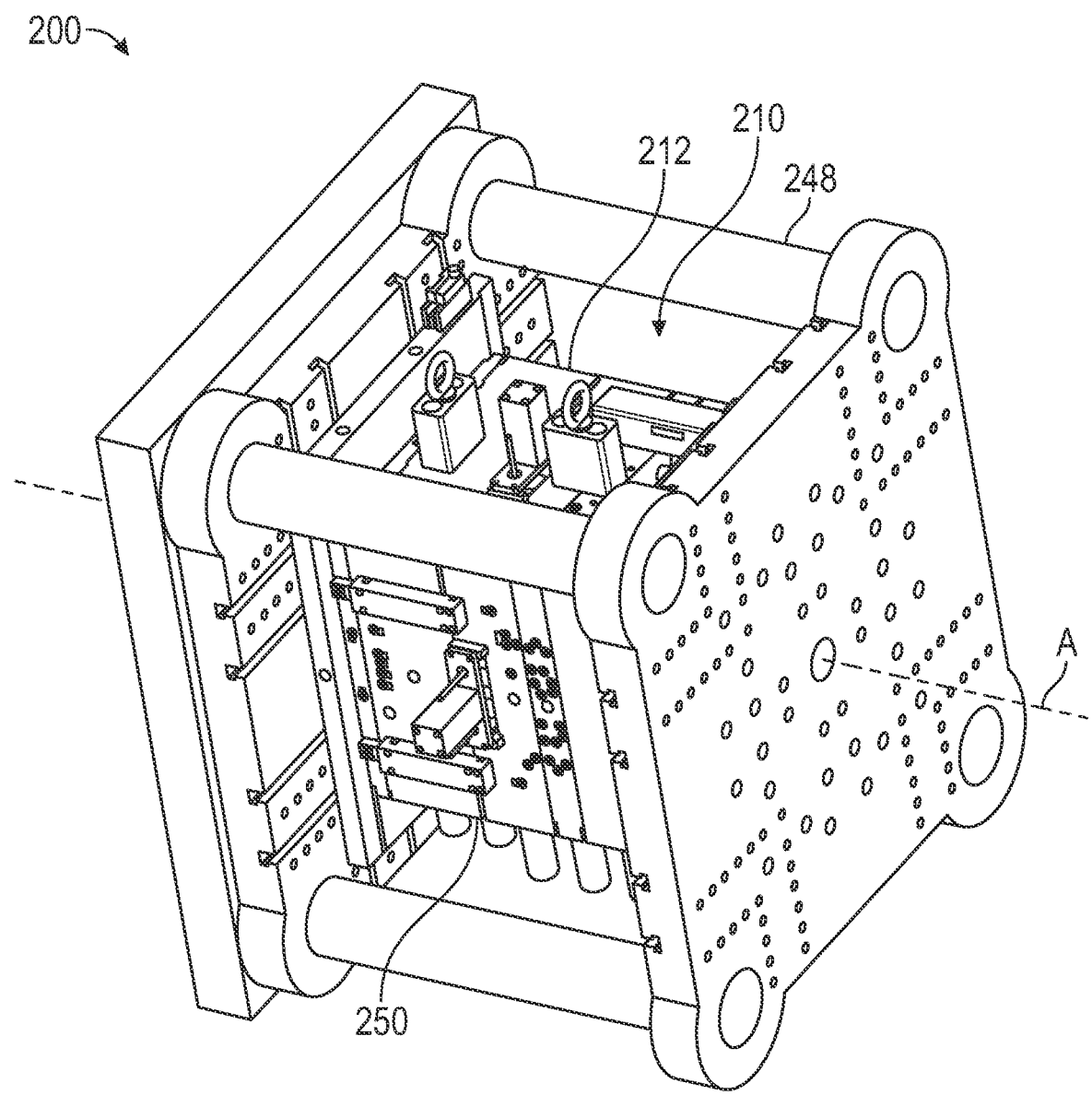
FIG. 11 is a perspective view of one example of an injection molding system for forming the pressure vessel of FIG. 1.

Referring to FIGS. 9 and 10, in selected examples, the first opening 124 may be formed on a section of the wall 102. The first opening 124 may extend through the wall 102. In certain examples, the first opening 124 may comprise multiple apertures 164 or paths that extending through the wall 102. For example, the first opening 124 may be circular in cross section. The body 101 may include dividing walls 166 that subdivide the first opening 124 into the multiple apertures 164. In selected examples, the dividing walls 166 may reinforce or strengthen the first opening 124. The first opening 124 may allow liquids and/or gases to pass into or out of the second inner volume 134, establishing communication between the second inner volume 134 and the exterior environment.

In certain examples, the second opening 126 may be formed on a section of the wall 102 and a section of the center column 130. The second opening 126 may extend through the center column 130 and the wall 102. In certain examples, the second opening 126 may comprise multiple apertures 164 or paths that extending through the center column 130 and the wall 102. For example, the second opening 126 may be circular in cross section. The dividing walls 166 may subdivide the second opening 126 into the multiple apertures 164. In selected examples, the dividing walls 166 may reinforce or strengthen the second opening 126. The second opening 126 may allow liquids and/or gases to pass into or out of the first inner volume 132, establishing communication between the first inner volume 132 and the exterior environment.

In selected examples, the pressure vessel 100 may be equipped for mounted to another structure. For example, the pressure vessel 100 may be equipped for mounting with a vehicle. In certain examples, the pressure vessel 100 may be equipped to mount at a slight angle or tilt. The tilt may allow the pressure vessel 100 to be secured with the axial direction 190b not parallel to the mounting surface. This arrangement may facilitate the flow of liquids from a higher level to a lower level, as an angle of tilt can be adjusted to promote efficient flow (e.g., in a system that requires gravity to move liquids) to the first opening 124, the second opening 126, or both the first opening 124 and the second opening 126.

The angle of tilt may be selected to overcome the first draft angle 160. That is, if the pressure vessel 100 were mounted with the axial direction 109b parallel to the horizontal, then the first draft angle 160 may prevent a small quantity of liquid at one end of the pressure vessel 100 from completely exiting out the second opening 126 located at an opposite end of the pressure vessel 100. To overcome the first draft angle 160, a tilt may suffice. That is, the tilt may be smaller than one degree. The tilt may compensate for the draft angle. For example, if the draft angle is 0.5°, the tilt is about or greater than 0.6°. Accordingly, the tilt may enable liquid to flow out of the first inner volume 132 more easily and liquid to more easily flow out of the second inner volume 134 through the first opening 124.

As described above, the pressure vessel 100 is formed of a polymeric material. As such, the pressure vessel 100 may formed by any suitable method. In one implementation, the pressure vessel 100 may be formed by injection molding. More specifically, the pressure vessel 100 may be monolithically formed by injection molding or one or more components that form the pressure vessel 100 may be formed by injection molding.

Figure 12:
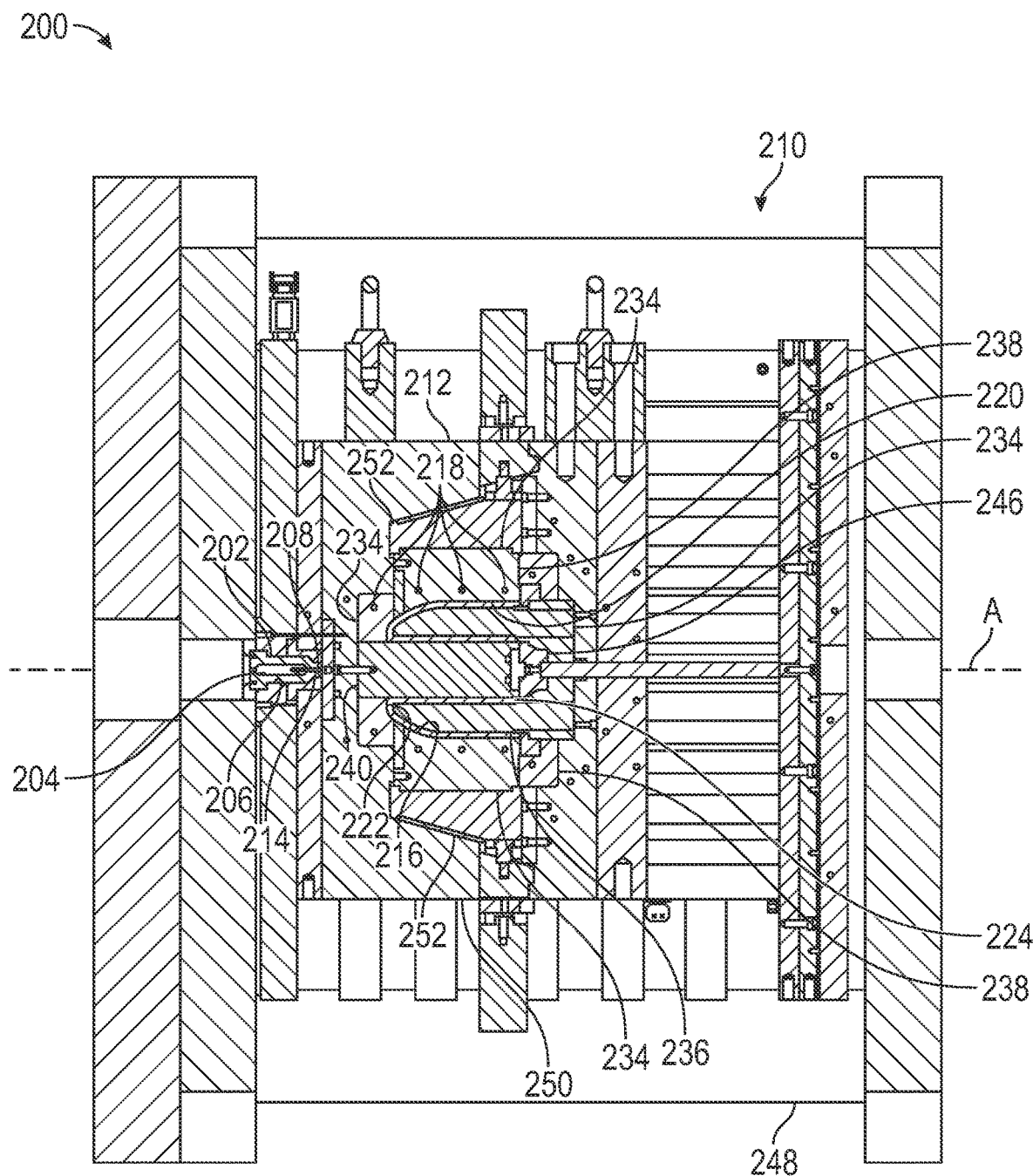
FIG. 12 is a cross-sectional view of the injection molding system of FIG. 11 in a closed position.

Accordingly, the pressure vessel 100 may be formed by an injection molding system 200. FIGS. 11-17 shows an example of the injection molding system 200. FIG. 12 is a cross-sectional view of the injection molding system 200 showing the injection molding system 200 including an injector 202 configured to compress and propel a polymeric material therethrough in a liquid state. In this example, the injector 202 comprises a screw 204 configured to compress the polymeric material into the liquid state. More specifically, the injector 202 defines a void 206 with the screw 204 disposed within the void 206. The injector 202 further defines a nozzle 208 in communication with the void 206 that has a cross-sectional area that is less than a cross-sectional area of the void 206. Rotation of the screw 204 moves the polymeric material toward the nozzle 208. The reduction in the cross-sectional area of the nozzle 208 increases pressure exerted on the polymeric material. The increase in pressure causes the polymeric material to change from the solid state to the liquid state. Although the injector 202 in the implementation shown in the Figures utilizes the screw 204, the injector 202 may comprise a ram or any other component suitable for compressing the polymeric material.

The polymeric material may comprise a thermoset polymer, a thermoplastic polymer, or any other suitable polymer. In one example, the polymer material comprises polyamides PA6x (a.k.a., nylons). The polyamides PA6x may include, but are not limited to, the following grades: PA6 and glass fibers or carbon fibers; PA66 and glass fibers; partially aromatic polyamides and glass fibers or carbon fibers; a blend of PA6 and PA66 plus various glass fiber or carbon fiber content; PA6 or PA66 soaked or enriched with long glass continuous unidirectional fibers (a.k.a., thermoplastic UD tape); and polyphthalamide and glass fibers. In another example, the polymer material comprises a thermoset polymer reinforcement over a thermoplastic polymer shell (e.g., an epoxy and continuous glass fiber wound over a nylon shell). To facilitate loading of the polymeric material into the injector 202 and movement of the polymeric material toward the nozzle 208, the polymeric material may comprise numerous pieces (e.g., pellets, granules, etc.) that move next to one another but are in the solid state under common atmospheric pressure and within a range of common atmospheric temperatures. The numerous pieces may flow through the injector 202 by rotation of the screw 204 and may be compressed against one another adjacent the nozzle 208. The increase in the pressure adjacent the nozzle 208 causes the pieces of the polymeric material to phase change from the solid state to the liquid state. The pieces in the liquid state blend with one another through the nozzle 208 to form a uniform stream of the polymeric material.

The injection molding system 200 further includes a mold 210. The mold 210 includes a mold body 212. The mold body 212 is mounted to and in fluid communication with the injector 202. More specifically, the mold body 212 defines an opening 214 in fluid communication with the nozzle 208 of the injector 202 for receiving the polymer in the liquid state. The mold body 212 may be formed of a metallic material (e.g., steel or aluminum) or any other material that is capable of maintaining a solid state when exposed to the heat and pressure of the polymeric material in the liquid state.

The mold body 212 defines a cavity 216 for receiving the polymeric material in the liquid state and forming the pressure vessel 100 as the polymeric material cools to a solid state. More specifically, the cavity 216 receives the polymeric material that flows through the opening 214 in the liquid state and holds the polymeric material as the polymeric material undergoes the phase change to the solid state. The mold body 212 may further define one or more coolant lines 218 that run adjacent the cavity 216 and are configured to flow a coolant (such as water) therethrough. The coolant may absorb heat that transfers from the polymeric material to the mold body 212, which then transfers to the coolant and flows away from the mold body 212. As such, the coolant may expedite the cooling of the polymeric material to the solid state in the cavity 216.

The cavity 216 includes a mold portion 220 configured to form the pressure vessel 100. More specifically, the mold portion 220 of the cavity 216 is shaped in the negative of the component to be formed for the pressure vessel 100. As such, the mold portion 220 receives the polymeric material in the liquid state. The polymeric material completely fills the mold portion 220 of the cavity 216 to prevent holes, hollows, voids, etc. from being formed in the component, which would weaken and compromise the structure of the pressure vessel 100. The mold portion 220 holds the polymeric material as the polymeric material cools from the liquid state to the solid state. The polymeric material in-turn takes on the shape of the mold portion 220 and maintains the shape in the solid state.

In the example shown in FIG. 12, the mold portion 220 has a substantially annular configuration that surrounds an axis A and extends longitudinally along the axis A between a first mold end 222 and a second mold end 224. More specifically, the mold portion 220 of the cavity 216 forms a portion of the pressure vessel 100. In particular, the mold portion 220 in FIG. 12 forms the upper shell 110 of the body 101 of the pressure vessel 100 when filled with the polymeric material. As such, the first end 103 of the body 101 corresponds with the first mold end 222 of the mold portion 220 and the weld seam 114 of the body 101 corresponds with the second mold end 224 of the mold portion 220. It is to be appreciated that the mold body 212 may define multiple cavities which each may form a distinct component of the pressure vessel 100 (e.g., the upper shell 110, the lower shell 112, etc.). The multiple cavities may be coupled to a single injector. Alternatively, multiple injectors may be utilized that are individually coupled to the cavities. In other implementations, multiple molds may be utilized. More specifically, each of the molds may have a single cavity 216 with each of the cavities configured for a different component of the pressure vessel 100. In another implementation, the mold portion 220 of the cavity 216 may be configured to form the pressure vessel 100 in its entirety in a monolithic construction.

Figure 15:
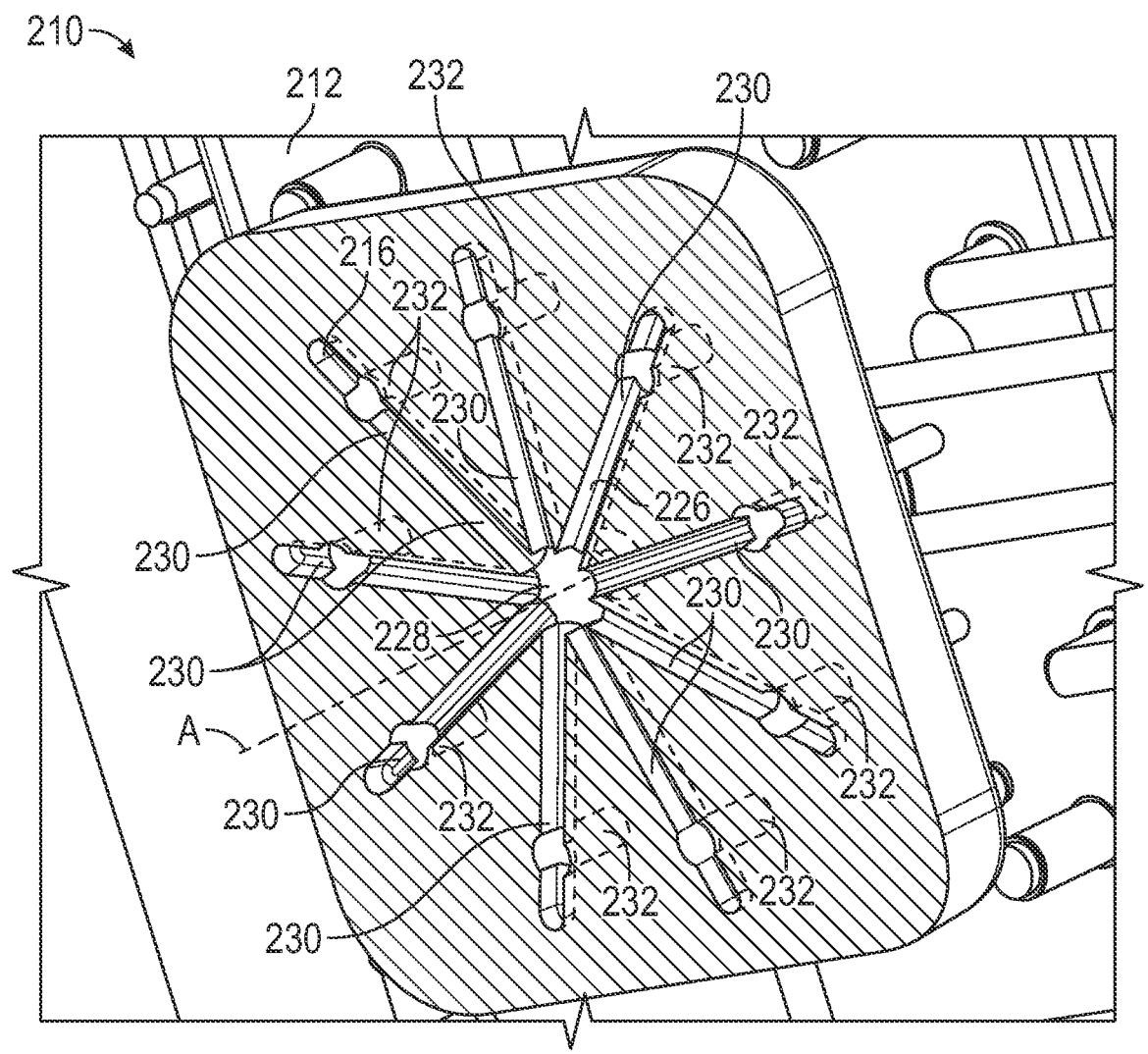
FIG. 15 is a perspective, cross-sectional view of a transport portion of a cavity of the injection molding system of FIG. 11.

FIG. 15 is a perspective, cross-sectional view showing the cavity 216. The cavity 216 further includes a transport portion 226 in fluid communication with the mold portion 220 and the injector 202 and configured to transmit the polymeric material from the injector 202 to the mold portion 220. More specifically, the transport portion 226 is configured to receive the polymeric material in the liquid state from the injector 202 through the opening 214 and transmit the polymeric material to the mold portion 220.

Figure 16:
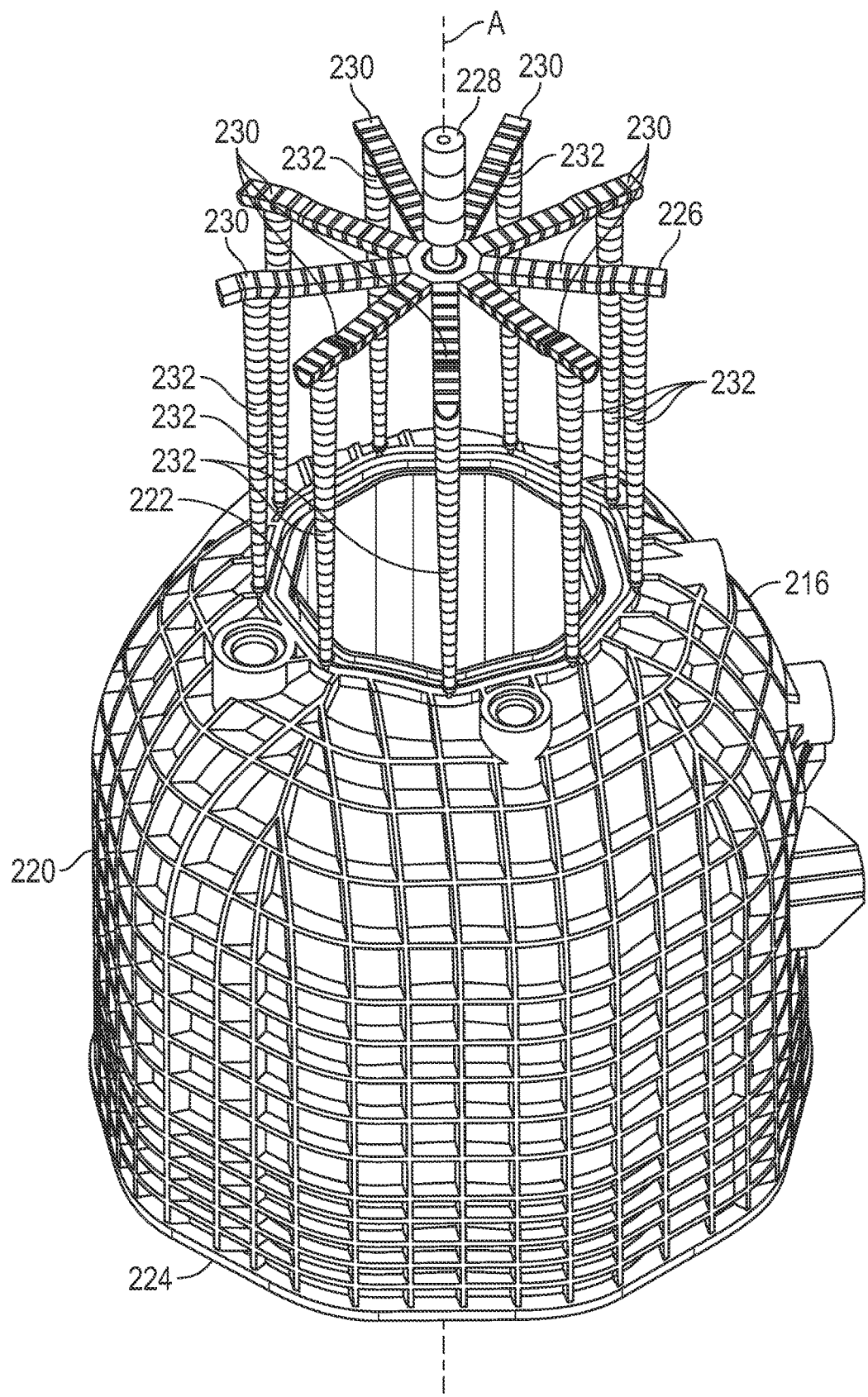
FIG. 16 is a perspective view of the cavity of the injection molding system of FIG. 11, showing the transport portion and a mold portion.
Figure 17:
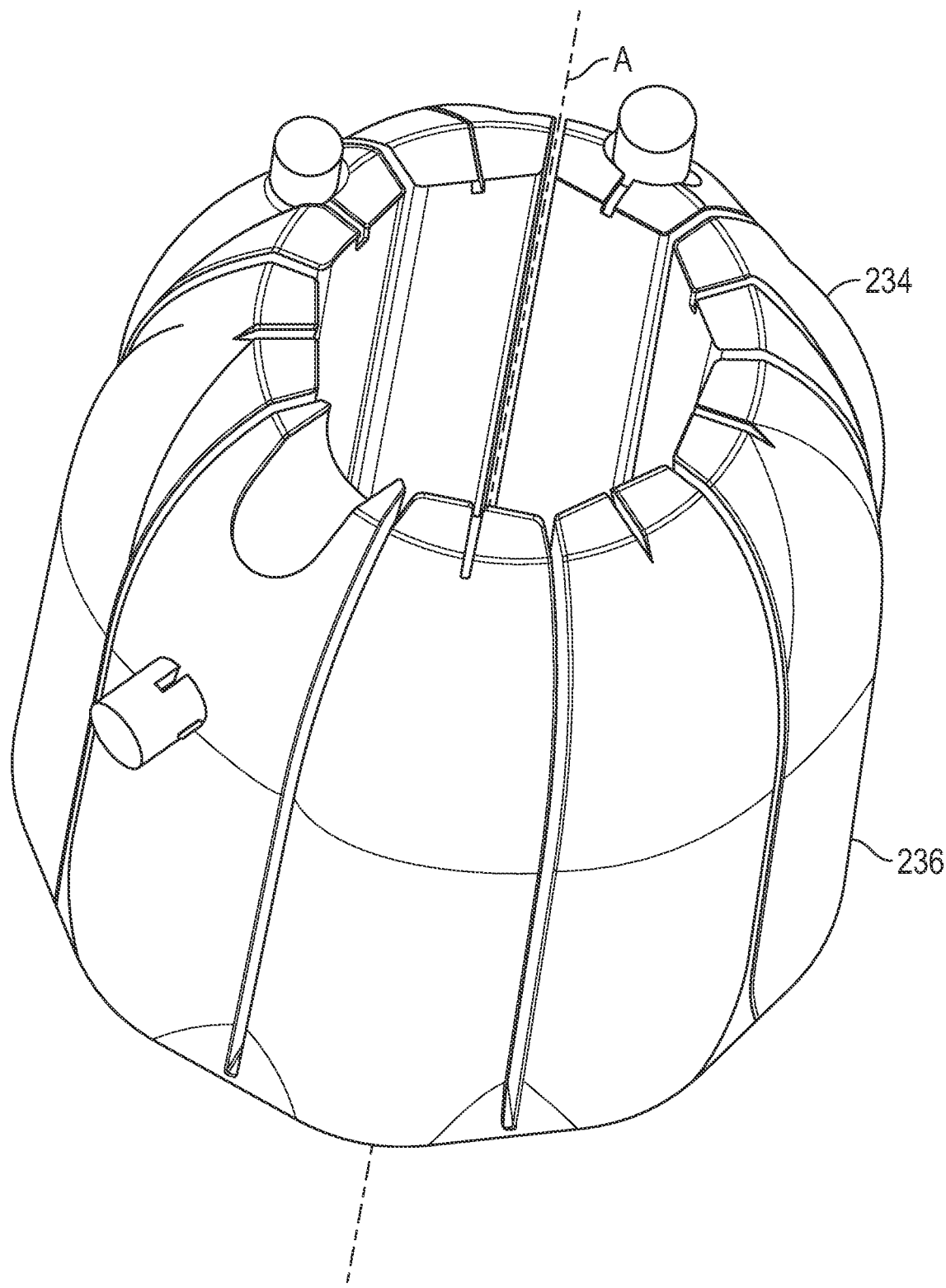
FIG. 17 is a perspective view of a core of a mold body of the injection molding system of FIG. 11.

FIG. 16 is a perspective view of the cavity 216 of the injection molding system 200. FIG. 16 shows that the transport portion 226 includes a sprue 228 connected to the injector 202 and extending between the injector 202 and the first mold end 222 of the mold portion 220. The sprue 228 extends along the axis A such that the sprue 228 is aligned longitudinally with the mold portion 220. As shown in FIGS. 15 and 16, the sprue 228 is aligned directly on the axis A. It is to be appreciated that the sprue 228 may be offset from the axis A.

The transport portion 226 further includes runners 230 connected to the sprue 228 and extending radially from the axis A (i.e., in a wagon wheel configuration). The runners 230 are evenly spaced from one another about the axis A. As such, the polymeric material in the fluid state transmits evenly from the sprue 228 to the runners 230. The runners 230 extend orthogonal to the axis A. However, the runners 230 may be positioned at any suitable angle to distribute the polymeric material away from the sprue 228 and the axis A.

The transport portion 226 further includes gates 232 connected to each of the runners 230 and to the first mold end 222 of the of the mold portion 220 spaced around the substantially annular configuration. The gates 232 provide the connection to the mold portion 220 of the cavity 216 and serve to distribute the polymeric material about the mold portion 220. In the example shown in FIGS. 15 and 16, each of the gates 232 are connected individually to the runners 230. However, more than one of the gates 232 may be coupled to any of the runners 230. The gates 232 extend parallel to the axis A. However, the gates 232 may be positioned at any suitable angle to distribute the polymeric material from the runners 230 to the mold portion 220 of the cavity 216. In the example shown in FIGS. 15 and 16, the cavity 216 comprises at least nine of the runners 230 and at least nine of the gates 232. However, any number of runners 230 and gates 232 may be utilized to distribute the polymeric material about the mold portion 220.

The runners 230 and the gates 232 distribute the polymeric material in the liquid state into the mold portion 220 of the cavity 216 uniformly while keeping injection pressure drop to a minimum inside the cavity 216. The location of the gates 232 about the annular configuration cause uniform weld line formation between adjacent flows of the polymeric material and reduces trapped air in the pressure vessel 100, material shrinkage, and part warpage. In particular, the radial disposition of the gates 232 about the annular configuration promotes uniform flow of the polymeric material from the first mold end 222 to the second mold end 224. All of the mold portion 220 of the cavity 216 fills the uniformly without any material race tracking (i.e., the creation of a void in the polymeric material that forms from flow through volumes with less pressure resistance). Furthermore, the radial disposition of the gates 232 about the annular configuration promotes even pressure drop radially about the mold portion 220, which in-turn allows for even and minimized deflection of the mold body 212 about the axis A. In particular, the gates 232 are equidistant from one another, which uniform deflection from the uniform distribution of the polymeric material.

Figure 13:
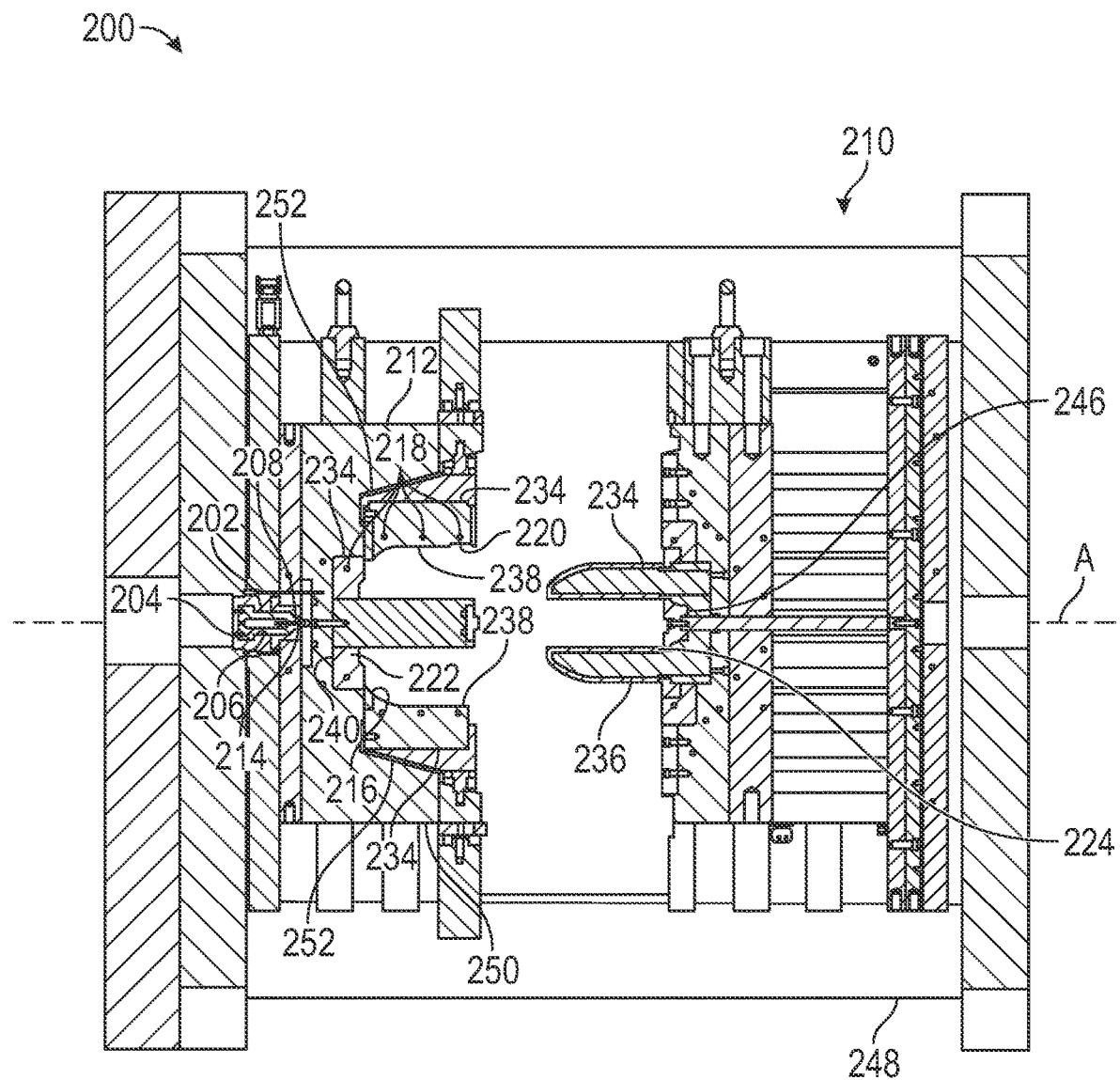
FIG. 13 is a cross-sectional view of the injection molding system of FIG. 11 in an open position.
Figure 14:
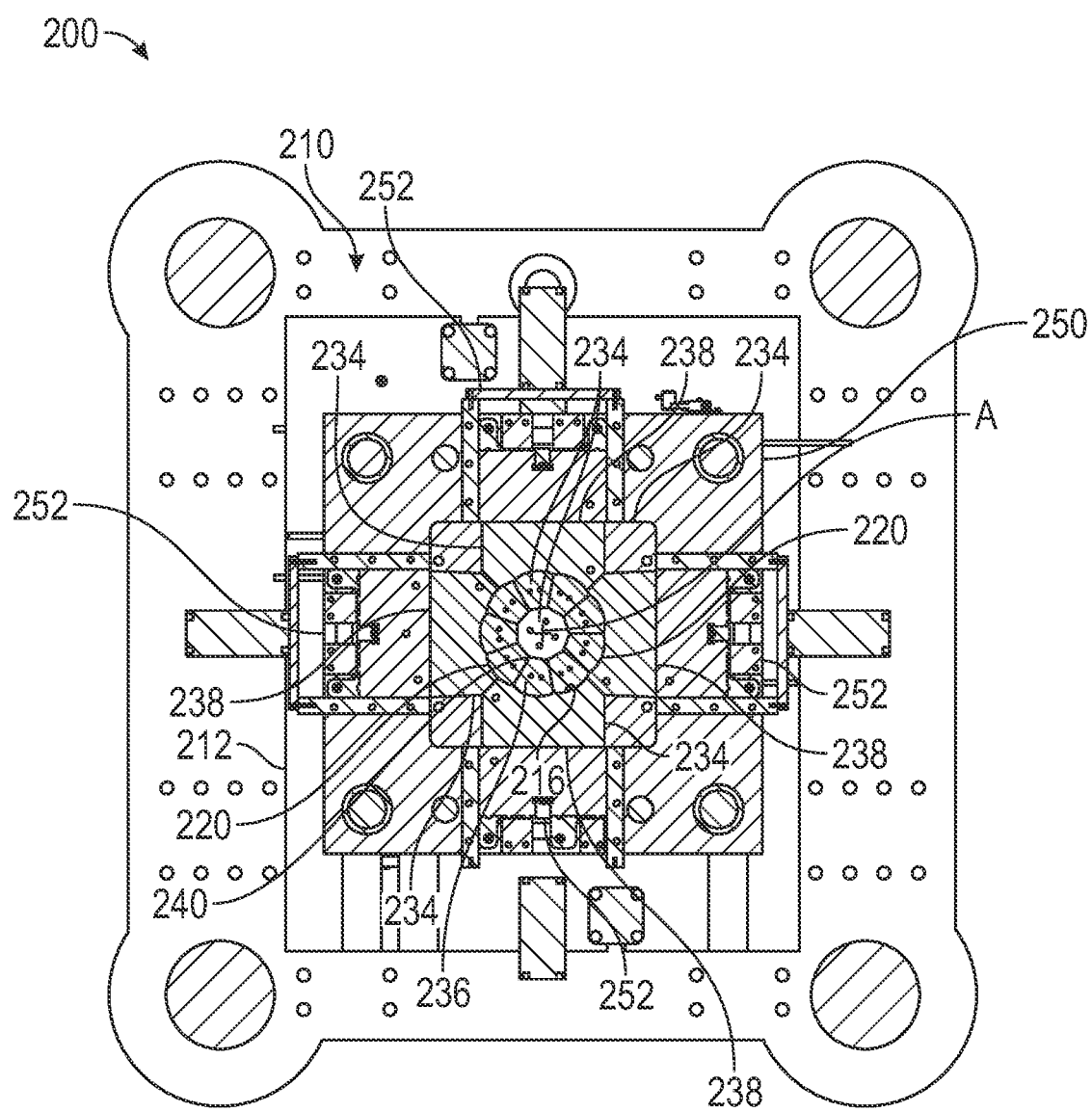
FIG. 14 is another cross-sectional view of the injection molding system of FIG. 11 in the closed position.

The mold body 212 may comprise at least two sections 234 configured to engage and collectively form the cavity 216 in a closed position (as shown in FIG. 12) for molding the pressure vessel 100 and with the sections 234 configured to be spaced from one another in an open position (as shown in FIG. 13) to separate the cavity 216 and for removing the pressure vessel 100 from the cavity 216. In the example shown in FIGS. 12-14, the mold body 212 comprises six of the sections 234. More specifically, the sections 234 include a core 236 (see FIGS. 12 and 13), four radial shell portions 238 (see FIG. 14), and a top cap 240 (see FIGS. 12 and 13). The core 236 forms an internal surface of the cavity 216 as well as the second mold end 224 of the mold portion 220 of the cavity 216. The core 236 is utilized to form the second inner volume 134 of the pressure vessel 100. The top cap 240 forms the first mold end 222 of the mold portion 220 of the cavity 216 as well as at least a portion of the transport portion 226 of the cavity 216. The top cap 240 is utilized to form the first inner volume 132 of the pressure vessel 100, with the center column 130 formed between the core 236 and the top cap 240. The four radial shell portions 238 engage one another radially about the axis A and forms an external surface of the cavity 216. The four radial shell portions 238 are positioned longitudinally along the axis A between the core 236 and the top cap 240. The four radial shell portions 238 in conjunction with the core 236 form the wall 102 of the pressure vessel 100.

The core 236 and the top cap 240 are movable along the axis A. The four radial shell portions 238 are movable radially relative to the axis A. In the closed position, the core 236, the top cap 240, and the four radial shell portions 238 engage one another and collectively form the cavity 216. To release the pressure vessel 100 (more specifically, the upper shell 110) the core 236 and the top cap 240 move away from one another along the axis Awhile the four radial shell portions 238 move radially outward from the axis A. In the open position, the pressure vessel 100 is typically disposed on the core 236. To remove the pressure vessel 100 from the core 236, the mold body 212 comprises an ejector portion 246 configured to engage and move the pressure vessel 100 out of the cavity 216. More specifically, the ejector portion 246 engages the pressure vessel 100 at the second mold end 224 and pushes the pressure vessel 100 along the axis A toward the top cap 240. In doing so, the ejector portion 246 pushes the pressure vessel 100 off the core 236.

As shown in FIGS. 11-14, the injection molding system 200 further includes a clamp 248 coupled to the mold body 212 and configured to move the sections 234 between the closed position and the open position. More specifically, the clamp 248 surrounds the mold body 212 is configured to move along the axis A. As such the clamp 248 moves the core 236 and top cap 240 between the open position and the closed position. As show in FIGS. 12-14, the mold body 212 further includes a housing 250 surrounding the four radial shell portions 238. The mold body 212 further includes actuators 252 individually coupled to each of the four radial shell portions 238 and the housing 250. The housing 250 retains the four radial shell portions 238. The actuators 252 move the four radial shell portions 238 relative to the housing 250 between the open position and the closed position. In the closed position, the clamp 248 exerts a force on the mold body 212 along the equal and opposite to the pressure exerted within the cavity 216 by the polymeric material to prevent separation of the sections 234 along the axis A during the injection molding process. At the same time, the actuators 252 and the housing 250 exert a force on the four radial shell portions 238 radially to the axis A that is equal and opposite to the pressure exerted within the cavity 216 by the polymeric material. As such, the housing 250 and the actuators 252 prevent separation of the sections 234 radial to the axis A during the injection molding process.

While the disclosure has been described in connection with certain examples, it is to be understood that the disclosure is not to be limited to the disclosed examples but, on the contrary, is intended to cover various modifications and equivalent arrangements included within the scope of the appended claims, which scope is to be accorded the broadest interpretation so as to encompass all such modifications and equivalent structures as is permitted under the law.

It should be noted in the examples of the present disclosure that, in the description of the present disclosure, orientations or positional relationships indicated by the terms "radial," "axial," "upper," "lower," "inner," "outer," "front," "rear," "left," "right," "center" and the like orientations or positional relationships shown in the drawings, which are only for convenience of description and do not indicate or imply a device or elements need to have a particular orientation, be constructed, and be operated in a particular orientation and are therefore not to be construed as limitations to the present disclosure.

In addition, it should be noted in the examples of the present disclosure that, in the description of the present disclosure, unless otherwise expressly specified and limited, the terms "set," "mounted," "connected" and "coupled" should be understood in a broad sense. For example, it may be a fixed connection, a detachable connection, or an integral connection; it may be a mechanical connection; it may be a direct connection, or an indirect connection through an intermediate medium, and it may be internal communication between two elements.

What is claimed is:

1. An injection molding system for forming a pressure vessel, the injection molding system comprising:
   an injector configured to compress and propel a polymeric material therethrough in a liquid state; and
   a mold body mounted to and in fluid communication with the injector, the mold body defining a cavity for receiving the polymeric material in the liquid state and forming the pressure vessel as the polymeric material cools to a solid state, the cavity comprising:
      a mold portion configured to form the pressure vessel, wherein the mold portion has a substantially annular configuration that surrounds an axis and extends longitudinally along the axis between a first mold end and a second mold end; and
      a transport portion in fluid communication with the mold portion and the injector and configured to transmit the polymeric material from the injector to the mold portion, wherein the transport portion comprises:
   a sprue connected to the injector and extending between the injector and the first mold end of the mold portion;
   runners connected to the sprue and extending radially from the axis; and
   gates connected to each of the runners and to the first mold end of the of the mold portion spaced around the substantially annular configuration.

2. The injection molding system of claim 1, wherein the sprue extends along the axis such that the sprue is aligned longitudinally with the mold portion.

3. The injection molding system of claim 1, wherein the runners are evenly spaced from one another about the axis.

4. The injection molding system of claim 3, wherein the runners extend orthogonal to the axis.

5. The injection molding system of claim 1, wherein each of the gates are connected individually to the runners.

6. The injection molding system of claim 1, wherein the cavity comprises at least nine of the runners and at least nine of the gates.

7. The injection molding system of claim 1, wherein the gates extend parallel to the axis.

8. The injection molding system of claim 1, wherein the injector comprises a screw configured to compress the polymeric material into the liquid state.

9. The injection molding system of claim 1, wherein the mold body comprises at least two sections configured to engage and collectively form the cavity in a closed position for molding the pressure vessel and with the sections configured to be spaced from one another in an open position to separate the cavity and for removing the pressure vessel from the cavity.

10. The injection molding system of claim 9, further comprising a clamp coupled to the mold body and configured to move the sections between the closed position and the open position.

11. A mold for an injection molding system, the mold comprising:
   a mold body defining a cavity for receiving a polymeric material in a liquid state and forming a pressure vessel as the polymeric material cools to a solid state, the cavity comprising:
     a mold portion configured to form the pressure vessel, wherein the mold portion has a substantially annular configuration that surrounds an axis and extends longitudinally along the axis between a first mold end and a second mold end; and
     a transport portion in fluid communication with the mold portion and configured to receive the polymeric material in the liquid state from an injector and transmit the polymeric material to the mold portion, wherein the transport portion comprises:
       a sprue configured to be connected to the injector and extend between the injector and the first mold end of the mold portion;
       runners connected to the sprue and extending radially from the axis; and
       gates connected to each of the runners and to the first mold end of the of the mold portion spaced around the substantially annular configuration.

12. The mold of claim 11, wherein the sprue extends along the axis such that the sprue is aligned longitudinally with the mold portion.

13. The mold of claim 11, wherein the runners are evenly spaced from one another about the axis.

14. The mold of claim 13, wherein the runners extend orthogonal to the axis.

15. The mold of claim 11, wherein each of the gates are connected individually to the runners.

16. The mold of claim 11, wherein the cavity comprises at least nine of the runners and at least nine of the gates.

17. The mold of claim 11, wherein the gates extend parallel to the axis.

18. The mold of claim 11, wherein the mold body comprises an ejector portion configured to engage and move the pressure vessel out of the cavity.

19. The mold of claim 11, wherein the mold body comprises at least two sections configured to engage and collectively form the cavity in a closed position for molding the pressure vessel and with the sections configured to be spaced from one another in an open position to separate the cavity and for removing the pressure vessel from the cavity.

20. A mold for an injection molding system, the mold comprising:
   a mold body defining a cavity for receiving a polymeric material in a liquid state and forming a pressure vessel as the polymeric material cools to a solid state, wherein the mold body comprises at least two sections configured to engage and collectively form the cavity in a closed position for molding the pressure vessel and with the sections configured to be spaced from one another in an open position to separate the cavity and for removing the pressure vessel from the cavity, the cavity comprising:
     a mold portion configured to form the pressure vessel, wherein the mold portion has a substantially annular configuration that surrounds an axis and extends longitudinally along the axis between a first mold end and a second mold end; and
     a transport portion in fluid communication with the mold portion and configured to receive the polymeric material in the liquid state from an injector and transmit the polymeric material to the mold portion, wherein the transport portion comprises:
       a sprue configured to be connected to the injector and extend between the injector and the first mold end of the mold portion, wherein the sprue extends along the axis such that the sprue is aligned longitudinally with the mold portion;
       runners connected to the sprue and extending radially from the axis, wherein the runners are evenly spaced from one another about the axis; and
       gates connected to each of the runners and to the first mold end of the of the mold portion spaced around the substantially annular configuration.

\* \* \* \* \*